(12) United States Patent
Kang et al.

(10) Patent No.: US 10,854,958 B2
(45) Date of Patent: *Dec. 1, 2020

(54) ELECTRONIC DEVICE INCLUDING GRIP SENSOR AND ANTENNA

(71) Applicant: Samsung Electronics Co., Ltd, Suwon-si (KR)

(72) Inventors: Kyung Kyun Kang, Suwon-si (KR); Jin U Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,784

(22) Filed: Dec. 31, 2019

(65) Prior Publication Data

US 2020/0136237 A1 Apr. 30, 2020

Related U.S. Application Data

(63) Continuation of application No. 16/117,739, filed on Aug. 30, 2018, now Pat. No. 10,559,873.

(30) Foreign Application Priority Data

Aug. 30, 2017 (KR) .......................... 10-2017-0110505

(51) Int. Cl.
*H01Q 1/24* (2006.01)
*H01Q 5/50* (2015.01)
(Continued)

(52) U.S. Cl.
CPC ............. *H01Q 1/245* (2013.01); *G06F 3/044* (2013.01); *H01Q 1/243* (2013.01); *H01Q 5/371* (2015.01);
(Continued)

(58) Field of Classification Search
CPC .. H01Q 1/24; H01Q 5/37; H01Q 5/50; H01Q 13/10; H01Q 9/42
(Continued)

(56) References Cited

U.S. PATENT DOCUMENTS 8,432,322 B2 4/2013 Amm et al.
9,285,989 B2 3/2016 Park et al.
(Continued)

FOREIGN PATENT DOCUMENTS

CN 104993216 A 10/2015
KR 10-2012-0031806 A 4/2012
(Continued)

OTHER PUBLICATIONS

ISA/KR, "International Search Report," International Application No. PCT/KR2018/010021, dated Dec. 5, 2018, 3 pages.
(Continued)

*Primary Examiner* — Andrea Lindgren Baltzell

(57) ABSTRACT

An electronic device is disclosed. The electronic device includes a housing that includes a cover glass that exposes a portion of a display, and a rear housing. The rear housing includes a first conductive region, a second conductive region physically spaced from the first conductive region, and an insulating material interposed between the first conductive and the second conductive regions. The housing also includes a printed circuit board, a wireless communication circuit, a grip sensor circuit, and a connection member. The wireless communication circuit and the grip sensor circuit are electrically connected with the first conductive region. The connection member is interposed between the printed circuit board and the rear housing and electrically connects the first conductive region and the second conductive region. The wireless communication circuit is configured to feed the first conductive region; and transmit or (Continued)

receive a signal in a frequency band based on an electrical path.

20 Claims, 18 Drawing Sheets

(51) Int. Cl.
    *H04M 1/725*     (2006.01)
    *G06F 3/044*     (2006.01)
    *H01Q 5/371*     (2015.01)
    *H01Q 13/10*     (2006.01)
    *H04M 1/02*     (2006.01)
    *H01Q 9/42*     (2006.01)

(52) U.S. Cl.
    CPC .............. *H01Q 5/50* (2015.01); *H01Q 13/10* (2013.01); *H04M 1/026* (2013.01); *H04M 1/72577* (2013.01); *H01Q 9/42* (2013.01); *H04M 1/72569* (2013.01); *H04M 2250/12* (2013.01); *H04M 2250/22* (2013.01)

(58) Field of Classification Search
    USPC .................................................. 343/700 MS
    See application file for complete search history.

(56) References Cited

U.S. PATENT DOCUMENTS

| | | |
|---|---|---|
| 9,448,587 B2 | 9/2016 | Park |
| 9,966,667 B2 | 5/2018 | Ayala Vazquez et al. |
| 10,147,999 B2 | 12/2018 | Wang et al. |
| 2012/0075212 A1* | 3/2012 | Park .................... G06F 3/0488 345/173 |
| 2012/0214412 A1 | 8/2012 | Schlub et al. |
| 2013/0241780 A1 | 9/2013 | Amm et al. |
| 2014/0218309 A1 | 8/2014 | Park |
| 2015/0205400 A1* | 7/2015 | Hwang .................... G06T 3/60 345/654 |
| 2015/0380812 A1 | 12/2015 | Black et al. |
| 2017/0012343 A1 | 1/2017 | Wang et al. |
| 2017/0033460 A1 | 2/2017 | Ayala Vazquez et al. |
| 2017/0047641 A1 | 2/2017 | Kim et al. |

FOREIGN PATENT DOCUMENTS

| | | |
|---|---|---|
| KR | 10-2014-0100335 A | 8/2014 |
| WO | 2015112405 A1 | 7/2015 |

OTHER PUBLICATIONS

Supplementary European Search Report dated Jun. 9, 2020 in connection with European Patent Application No. 18 84 9891, 9 pages.

* cited by examiner

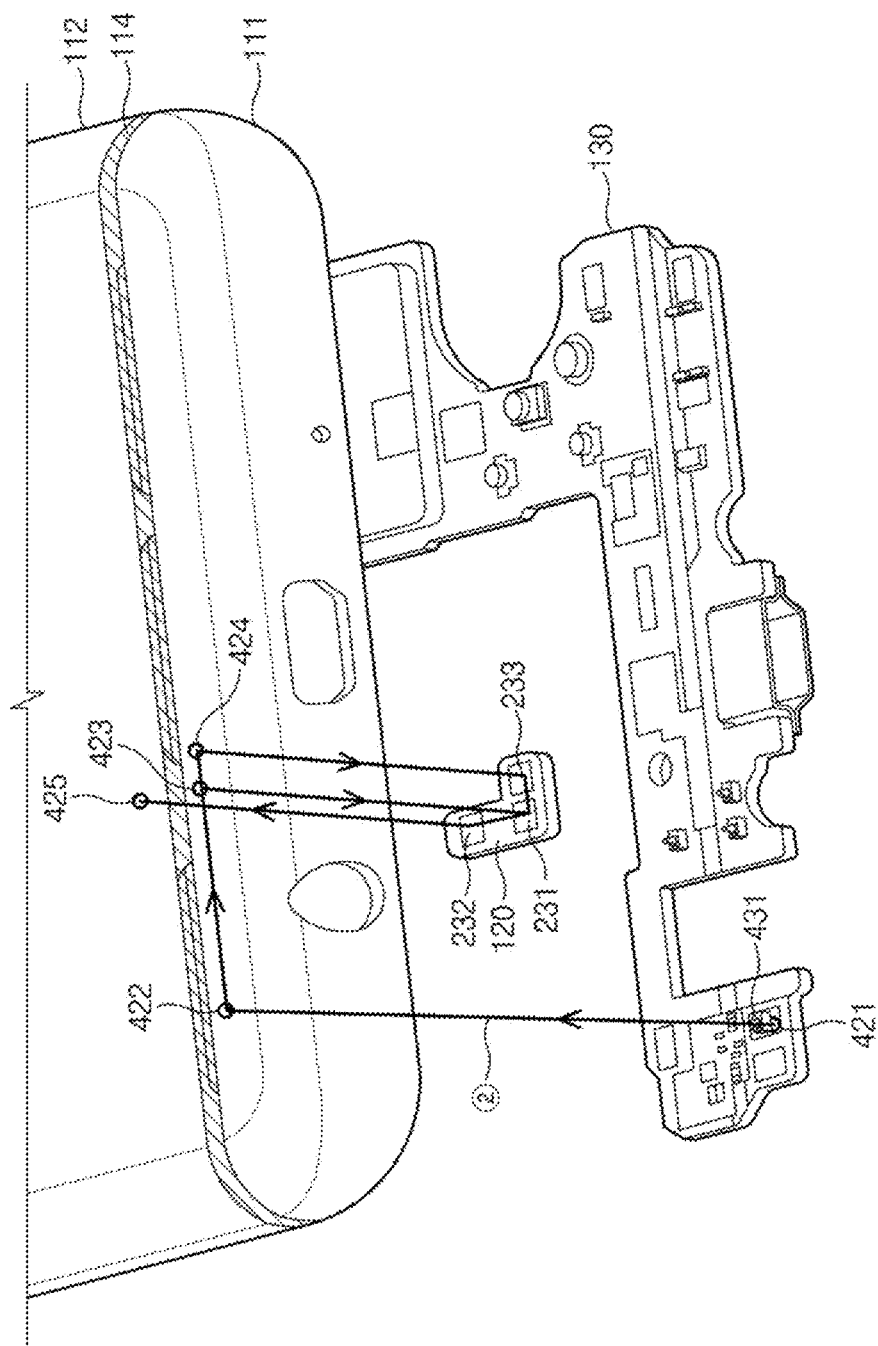

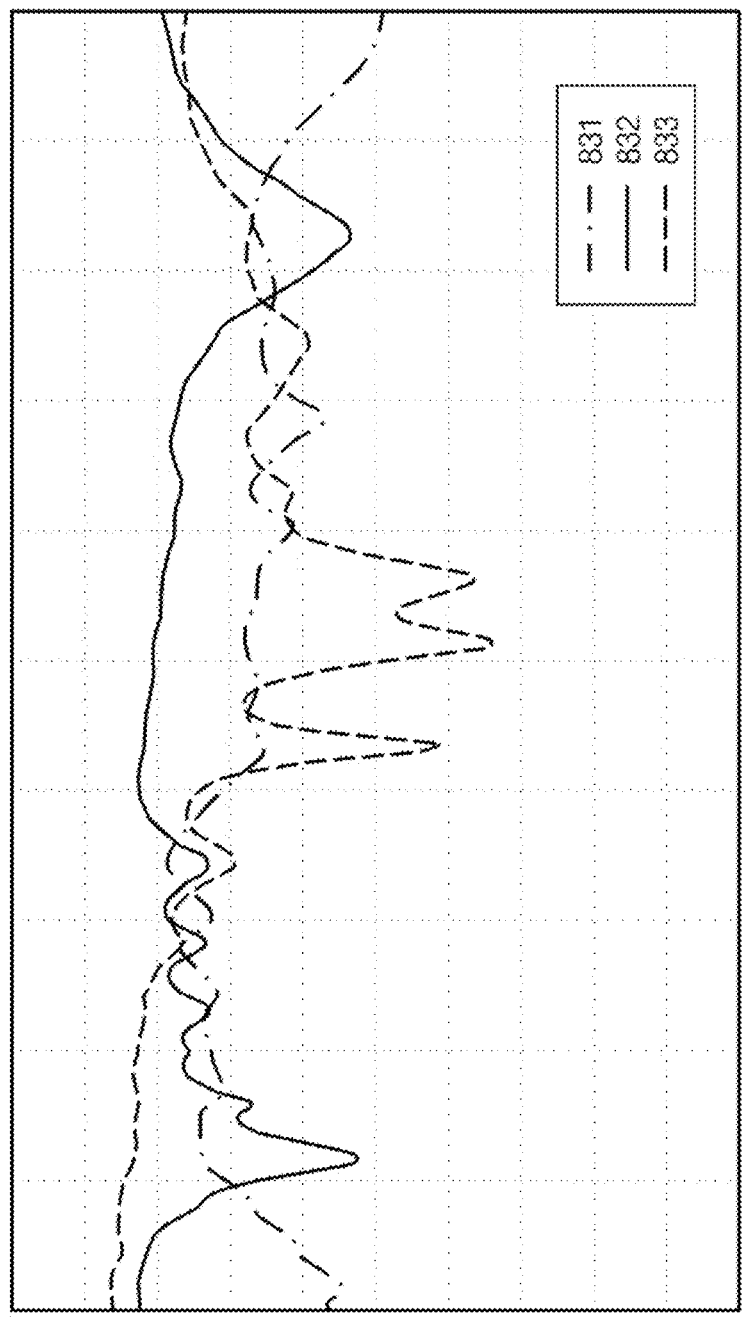

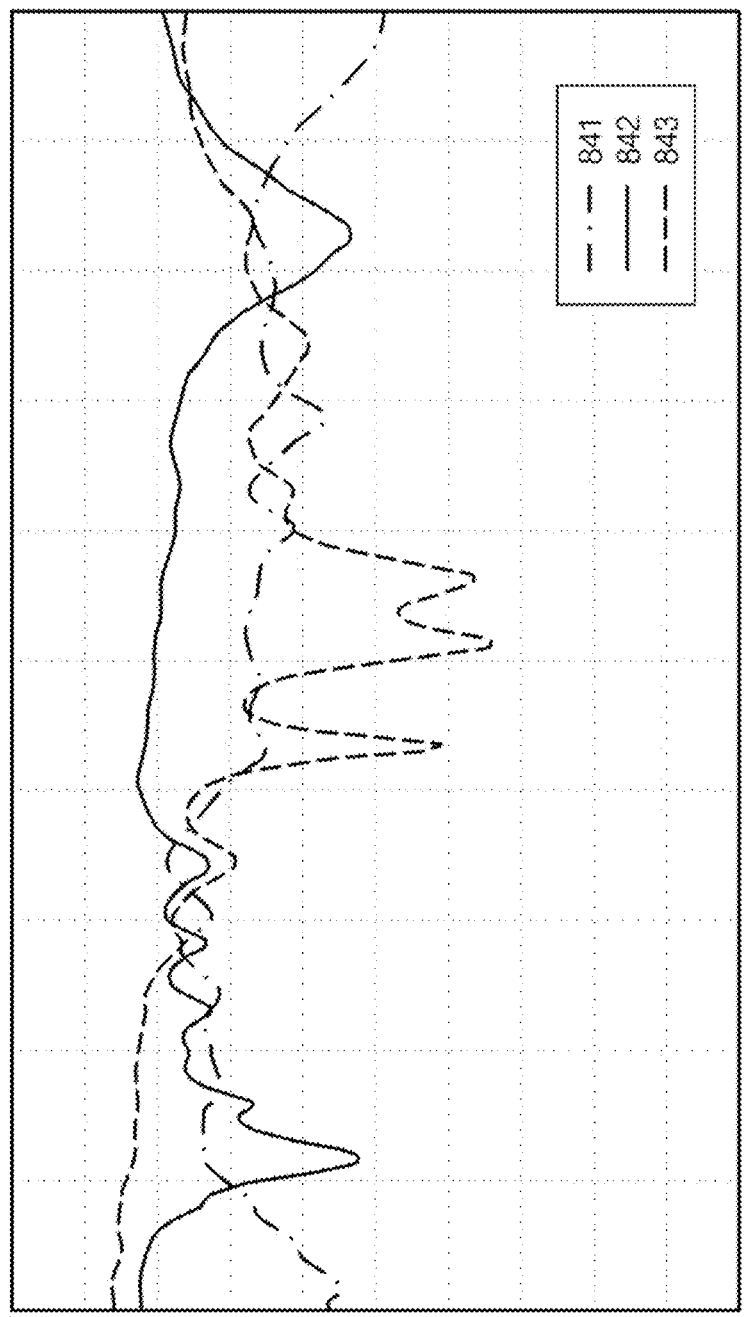

ELECTRONIC DEVICE INCLUDING GRIP SENSOR AND ANTENNA

CROSS-REFERENCE TO RELATED APPLICATIONS

This application is a continuation of U.S. patent application Ser. No. 16/117,739 filed on Aug. 30, 2018, which is based on and claims priority under 35 U.S.C. § 119 to Korean Patent Application No. 10-2017-0110505 filed on Aug. 30, 2017 in the Korean Intellectual Property Office, the disclosures of which are herein incorporated by reference in their entirety.

BACKGROUND

1. Field

The present disclosure relates to a technology for mounting a grip sensor and an antenna on an electronic device.

2. Description of Related Art

A housing may form the exterior of an electronic device (e.g., a smartphone, a wearable device, or the like). Nowadays, the supply of an electronic device equipped with a metal housing is increasing.

The electronic device may include a grip sensor or an antenna. For example, the electronic device may use at least a portion of the metal housing as a radiator of an antenna. For example, when a user approaches the electronic device or touches the electronic device, a capacitance of the electronic device may change. The grip sensor may sense whether the user approaches the electronic device or touches the electronic device, based on the variation in capacitance.

The above information is presented as background information only to assist with an understanding of the present disclosure. No determination has been made, and no assertion is made, as to whether any of the above might be applicable as prior art with regard to the present disclosure.

SUMMARY

The electronic device may use a portion of a metal rear housing as a radiator of an antenna. However, in the case where the grip sensor is included in the electronic device, the electronic device may not connect the portion of the metal rear housing used as the radiator of the antenna to a ground region. In this case, the rate at which the antenna transmits or receives a signal may decrease. Also, the isolation between antennas may decrease.

Aspects of the present disclosure are to address at least the above-mentioned problems and/or disadvantages and to provide at least the advantages described below. Accordingly, an aspect of the present disclosure is to provide an electronic device which electrically connects at least a portion of a metal housing used as a radiator of an antenna to a ground region by using an electronic circuit.

In accordance with an aspect of the present disclosure, an electronic device may include a housing that includes a cover glass through which at least a portion of a display is exposed, and a rear housing coupled with the cover glass, wherein the rear housing includes a first conductive region, a second conductive region physically spaced from the first conductive region, and an insulating material interposed between the first conductive region and the second conductive region, a printed circuit board that is positioned within the housing, a wireless communication circuit that is positioned on the printed circuit board and is electrically connected with the first conductive region, a grip sensor circuit that is positioned on the printed circuit board and is electrically connected with the first conductive region, and a connection member that is interposed between the printed circuit board and the rear housing and electrically connects the first conductive region and the second conductive region. The wireless communication circuit may feed the first conductive region and may transmit/receive a signal in a specified frequency band based on a first electrical path formed through the first conductive region, the connection member, and the second conductive region, and the grip sensor circuit may sense whether a user approaches the electronic device or whether the user touches the housing, based on a capacitance on a second electrical path connected to the grip sensor circuit from the first conductive region and the second conductive region through the connection member.

In accordance with another aspect of the present disclosure, an electronic device may include a housing that includes a cover glass through which at least a portion of a display is exposed, and a rear housing coupled with the cover glass, wherein the rear housing includes a first conductive region, a second conductive region physically spaced from the first conductive region, and an insulating material interposed between the first conductive region and the second conductive region, a printed circuit board that is positioned within the housing, a wireless communication circuit that is positioned on the printed circuit board and is electrically connected with the first conductive region, a grip sensor circuit that is positioned on the printed circuit board and is electrically connected with the first conductive region, and a plurality of connection elements that are positioned on a path electrically connecting the first conductive region and the second conductive region. The wireless communication circuit may feed the first conductive region, and may transmit/receive a signal in a specified frequency band based on an electrical path formed through the first conductive region, the plurality of connection elements, and the second conductive region, and the grip sensor circuit may sense whether a user approaches the electronic device or whether the user touches the housing, based on a capacitance on an electrical path connected to the grip sensor circuit from the first conductive region and the second conductive region through the plurality of connection elements.

In accordance with another aspect of the present disclosure, an electronic device may include a housing that includes a front plate and a rear plate facing the front plate, wherein the rear plate includes a first conductive region including a first edge, a second conductive region including a second edge adjacent to the first edge, and a first non-conductive region electrically separating the first conductive region and the second conductive region, and wherein the first non-conductive region extends from the first edge to the second edge so as to contact the first and second edges and is interposed between the first edge and the second edge, a touchscreen display that is interposed between the front plate and the rear plate and is exposed through the front plate, a printed circuit board that is interposed between the front plate and the rear plate, a wireless communication circuit that is mounted on the printed circuit board and is electrically connected with a first point of the first conductive region, and an electronic circuit that includes a first end electrically connected with a second point of the first conductive region and a second end electrically connected with one point of the second conductive region and includes at least one circuit element electrically connecting the first end and the second end.

According to embodiments of the present disclosure, an electronic device may improve the rate at which an antenna transmits or receives a signal. According to embodiments of the present disclosure, it may be possible to improve the isolation between antennas included in the electronic device.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4B illustrates an electrical path through which an electronic device transmits/receives a signal, according to an embodiment of this disclosure;

FIG. 8C illustrates an isolation of antennas and a reflection coefficient of each antenna, according to an embodiment of this disclosure;

FIG. 8D illustrates an isolation of antennas and a reflection coefficient of each antenna, according to an embodiment of this disclosure;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
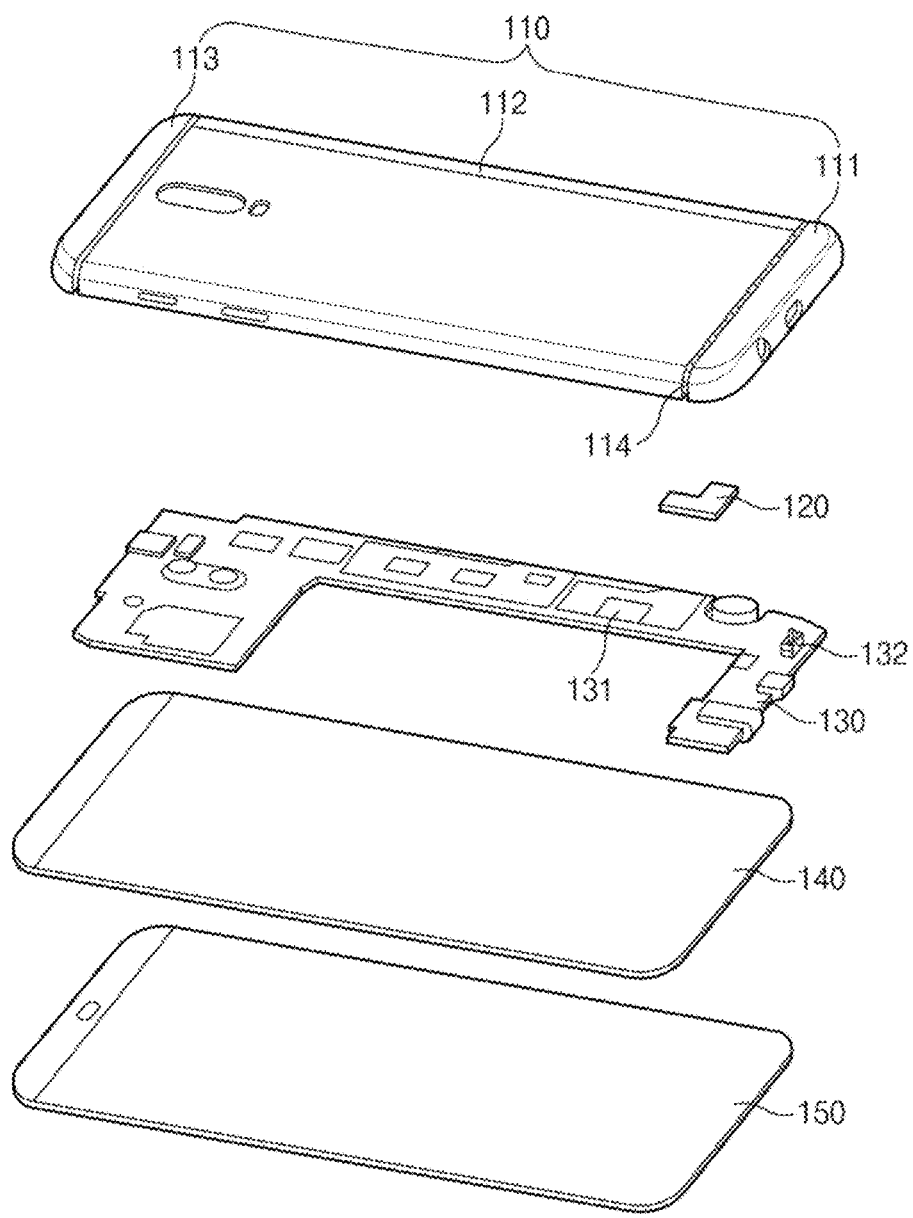
FIG. 1 illustrates an exploded perspective view of an electronic device according to an embodiment of this disclosure.

FIG. 1 illustrates an exploded perspective view of an electronic device according to an embodiment of this disclosure.

Referring to FIG. 1, an electronic device 100 may include a housing, a connection member 120, a printed circuit board 130, and a display 140. According to an embodiment, the electronic device 100 may be implemented without some of the components illustrated in FIG. 1 or may be implemented to further include one or more components not illustrated in FIG. 1. For another example, the order in which the components included in the electronic device 100 are stacked may be different from the stacked order illustrated in FIG. 1.

According to an embodiment, the housing may include a rear housing 110 and a cover glass 150. The rear housing 110 may protect the components included in the electronic device 100. For example, the printed circuit board 130, the display 140, a battery, and the like may be accommodated within the rear housing 110, and the rear housing 110 may protect the components from an external shock. According to an embodiment, the rear housing 110 may be formed of tempered glass, plastic, and/or metal.

According to an embodiment, the rear housing 110 may include a first conductive region 111, a second conductive region 112, or a third conductive region 113. For example, the first conductive region 111, the second conductive region 112, or the third conductive region 113 may be physically separated from each other. For example, a non-conductive region 114 (e.g., plastic) may be interposed between the first conductive region 111 and the second conductive region 112. For another example, a non-conductive material (not illustrated) may be interposed between the second conductive region 112 and the third conductive region 113.

According to an embodiment, the electronic device 100 may use at least a portion of the first conductive region 111 or the third conductive region 113 as a radiator of an antenna. For example, the electronic device 100 may transmit/receive a signal in a high band through the first conductive region 111. For another example, the electronic device 100 may transmit/receive a Wi-Fi signal through the third conductive region 113. For another example, the second conductive region 112 may be a ground region of an antenna.

According to an embodiment, the cover glass 150 may transmit light generated by the display 140. For another example, the user may touch a portion (e.g., a finger) of his/her body on the cover glass 150 to perform a touch (including a contact using an electronic pen). For example, the cover glass 150 may be formed of tempered glass, reinforced plastics, a flexible polymer material, or the like. According to various embodiments, the cover glass 150 may be also referred to as a "glass window".

According to an embodiment, the connection member 120 may be interposed between the rear housing 110 and the printed circuit board 130. For example, a first end of the connection member 120 may be electrically connected with the rear housing 110, and a second end of the connection member 120 may be electrically connected with the printed circuit board 130.

According to an embodiment, the connection member 120 may electrically connect the first conductive region 111 and the second conductive region 112. For example, the connection member 120 may be attached to the rear housing 110 through an adhesive material. For example, the first end of the connection member 120 may be attached to the first conductive region 111, and the second end of the connection member 120 may be attached to the second conductive region 112. As such, the first conductive region 111 may be electrically connected with the second conductive region 112 through the connection member 120.

According to an embodiment, various electronic parts, elements, or a printed circuit, or the like of the electronic device 100 may be mounted on the printed circuit board (PCB) 130. For example, a wireless communication circuit 131 (e.g., a communication processor (CP), an application processor (AP), a memory, or the like may be mounted on the printed circuit board 130. In the present disclosure, the printed circuit board 130 may be referred to as a "main board" or "printed board assembly (PBA)".

According to an embodiment, the wireless communication circuit 131 may be electrically connected with the first conductive region 111. For example, the wireless communication circuit 131 may be connected with a connection element 132 (e.g., a C-clip) positioned at one point on the printed circuit board 130 through a specified wiring (e.g., a flexible printed circuit board (FPCB)). The connection element 132 may be in contact with one point of the first conductive region 111. For example, the wireless communication circuit 131 may be electrically connected with the first conductive region 111 through the specified wiring and the connection element 132.

According to an embodiment, the wireless communication circuit 131 may feed the first conductive region 111, and may transmit/receive a signal in a specified frequency band based on an electrical path formed through the first conductive region 111. In the present disclosure, "feed" or "feeding" may mean an operation in which the wireless communication circuit 131 applies a current to at least a portion of an antenna radiator (e.g., the first conductive region 111 or the third conductive region 113).

According to an embodiment, the display 140 may be interposed between the printed circuit board 130 and the cover glass 150. The display 140 may be electrically connected with the printed circuit board 130, and may output content (e.g., a text, an image, a video, an icon, a widget, a symbol, or the like). In the case where the display 140 includes a touch panel (not illustrated), the display 140 may receive a touch input (e.g., a touch, a gesture, a hovering, or the like) from the user.

In the present disclosure, the description given with reference to FIG. 1 may be identically applied to components having the same reference numerals/marks as the electronic device 100 described with reference to FIG. 1.

Figure 2A:
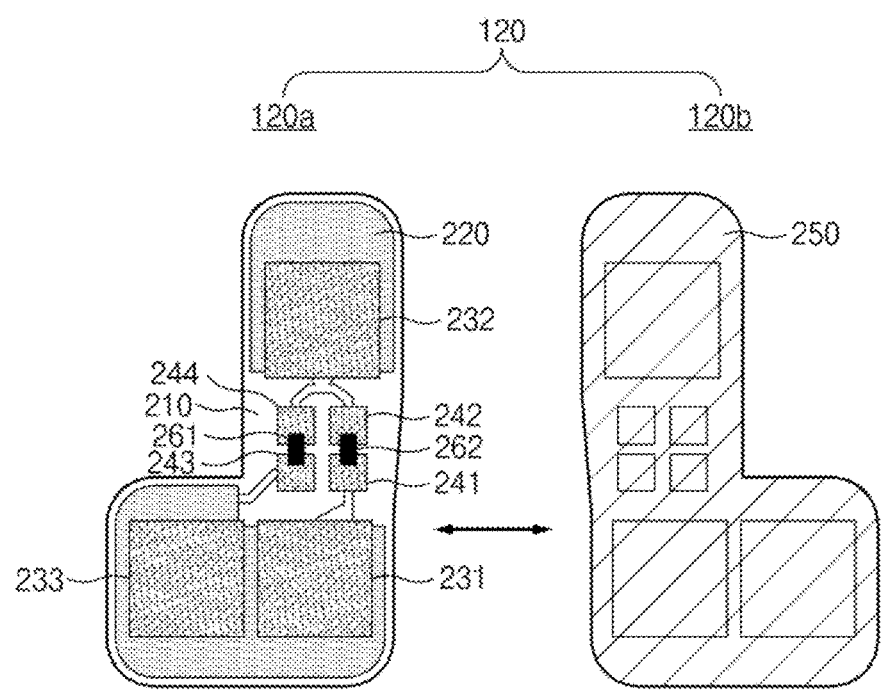
FIG. 2A illustrates a front surface and a rear surface of a connection member according to an embodiment of this disclosure.
Figure 2B:
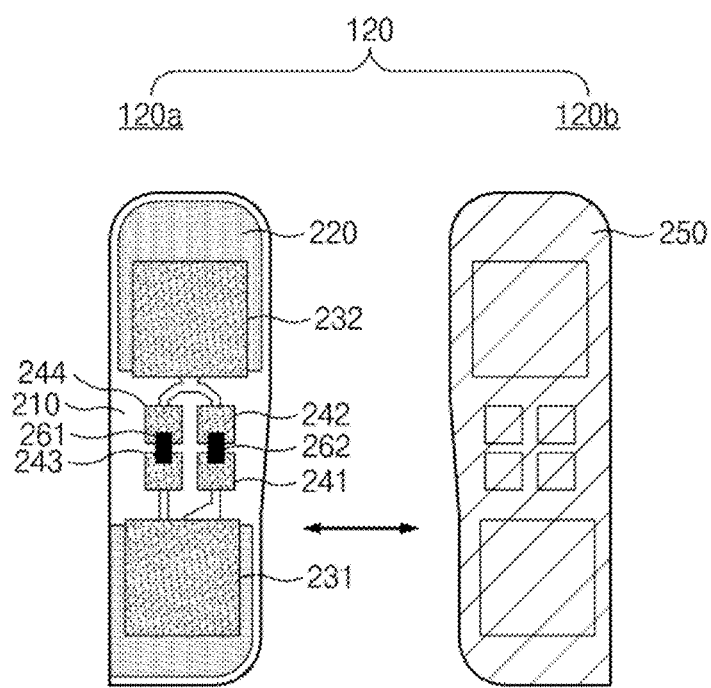
FIG. 2B illustrates a front surface and a rear surface of a connection member according to an embodiment of this disclosure.

FIG. 2A illustrates a front surface and a rear surface of a connection member according to an embodiment of this disclosure. FIG. 2B illustrates a front surface and a rear surface of a connection member according to an embodiment of this disclosure.

Referring to FIG. 2A, the connection member 120 may include a non-conductive layer 210, a conductive layer 220, a plurality of metal pads 231, 232, 233, 241, 242, 243, and 244, and at least one circuit element 261 or 262. The non-conductive layer 210 may be formed of, for example, plastic. The conductive layer 220 may be stacked, for example, on the non-conductive layer 210 and may be formed of a conductive material such as copper (Cu).

According to an embodiment, the metal pads 231, 232, and 233 may be positioned adjacent to an edge (e.g., a side) of the connection member 120. For example, the first metal pad 231 and the third metal pad 233 may be positioned adjacent to a first end of the connection member 120, and the second metal pad 232 may be positioned adjacent to a second end of the connection member 120.

According to an embodiment, the metal pads 241, 242, 243, and 244 may connect the at least one circuit element 261 or 262. For example, the fifth metal pad 243 and the sixth metal pad 244 may connect the first circuit element 261, and the seventh metal pad 241 and the eighth metal pad 242 may connect the second circuit element 262.

According to an embodiment, the at least one circuit element 261 or 262 may be interposed between the metal pads 231, 232, and 233. For example, the at least one circuit element 261 or 262 may be interposed between the first metal pad 231 (or the third metal pad 233) and the second metal pad 232. For example, the circuit element 261 or 262 may include a capacitor, an inductor, a varistor, or the like. For another example, a capacitance of the circuit element 261 or 262 may be, for example, 0.5 pF to 100 pF.

According to an embodiment, the at least one circuit element 261 or 262 may be connected with the metal pads 231, 232, and 233 through a specified wiring. For example, the first metal pad 231 and the seventh metal pad 241 may be connected through a specified wiring, and the second metal pad 232 and the eighth metal pad 242 may be connected through a specified wiring. The second circuit element 262 may be connected with the seventh metal pad 241 and the eighth metal pad 242.

According to an embodiment, the first conductive region 111 may be connected with the second conductive region 112 through the connection member 120. For example, the first conductive region 111 may be connected with the second conductive region 112 through the first metal pad 231, the seventh metal pad 241, the circuit element 262, the eighth metal pad 242, and the second metal pad 232.

Referring to FIG. 2B, the number of metal pads included in the connection member 120 may be different from the number of metal pads illustrated in FIG. 2A. For example, the connection member 120 may include six metal pads 231, 232, 241, 242, 243, and 244 and at least one circuit element 261 or 262. For example, the first conductive region 111 may be connected with the second conductive region 112 through the first metal pad 231, the first circuit element 261, the second circuit element 262, and the second metal pad 232.

According to an embodiment, an adhesive material 250 may be positioned on a rear surface 120b of the connection member 120. In the case where the connection member 120 and the rear housing 110 are coupled, the adhesive material 250 may fix the connection member 120 on the rear housing 110. For example, the adhesive material 250 may include a conductive tape or the like.

In the present disclosure, the description given with reference to FIGS. 2A and 2B may be identically applied to components having the same reference numerals/marks as the connection member 120 described with reference to FIGS. 2A and 2B.

Figure 3:
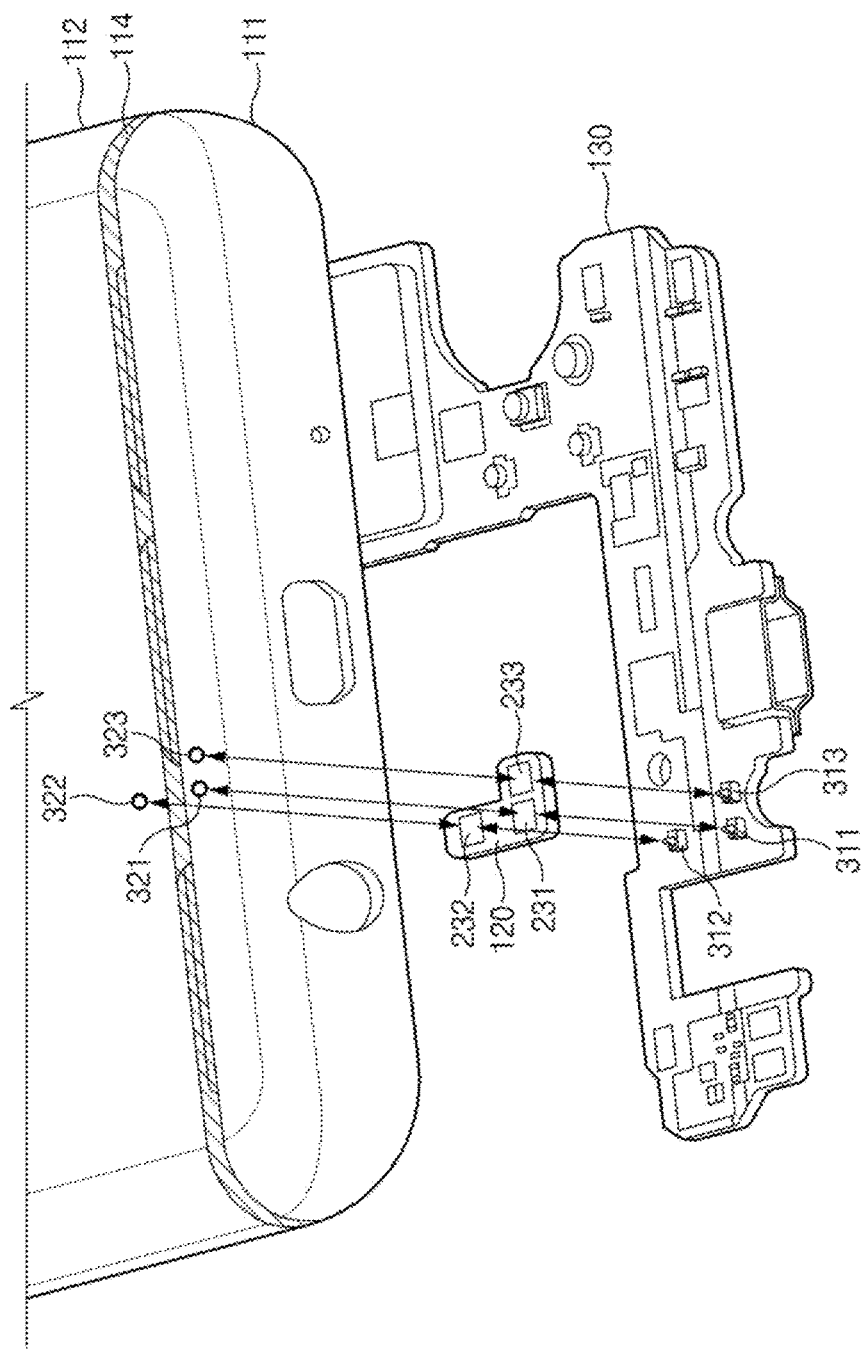
FIG. 3 illustrates a coupling shape between a rear housing, a connection member, and a printed circuit board according to an embodiment of this disclosure.

FIG. 3 illustrates a coupling shape between a rear housing, a connection member, and a printed circuit board according to an embodiment of this disclosure.

Referring to FIG. 3, connection elements 311, 312, and 313 (e.g., a C-clip) may be arranged in one region on the printed circuit board 130. The connection elements 311, 312, and 313 may be arranged, for example, in a region where the connection member 120 is coupled to the printed circuit board 130. The connection elements 311, 312, and 313 may be in contact with the metal pads 231, 232, and 233, for example. For example, the first connection element 311 may be in contact with the first metal pad 231, the second connection element 312 may be in contact with the second metal pad 232, and the third connection element 313 may be in contact with the third metal pad 233.

According to an embodiment, as the connection member 120 is attached to the rear housing 110 through the adhesive material 250, the connection member 120 may electrically connect the first conductive region 111 and the second conductive region 112. For example, a first point 321 on the first conductive region 111 may be in contact with the first metal pad 231, and a second point 322 on the second conductive region 112 may be in contact with the second metal pad 232. For another example, the third metal pad 233 may be in contact with a third point 323 on the first conductive region 111. Since the metal pads 231, 232, and 233 are connected through the circuit elements 261 and 262, the first conductive region 111 may be electrically connected with the second conductive region 112 through the first metal pad 231 (and/or the third metal pad 233), the circuit elements 261 and 262, or the second metal pad 232.

According to an embodiment, the rear housing 110 may be electrically connected with the printed circuit board 130 through the connection member 120. For example, since the first connection element 311 is in contact with the first metal pad 231, the first point 321 on the first conductive region 111 and the first connection element 311 may be electrically connected. According to another embodiment, since the second connection element 312 is in contact with the second metal pad 232, the second point 322 on the second conductive region 112 and the second connection element 312 may be electrically connected.

Figure 4A:
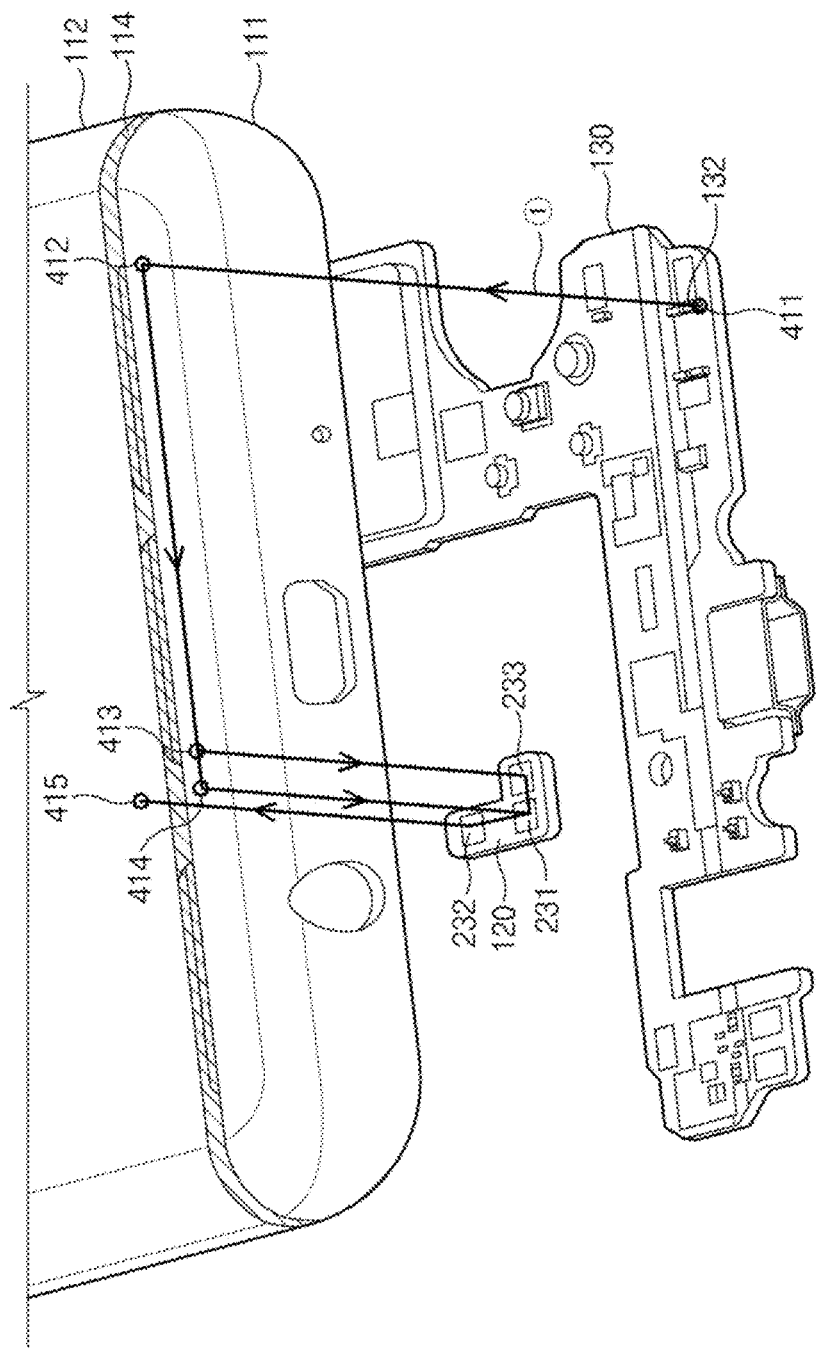
FIG. 4A illustrates an electrical path through which an electronic device transmits/receives a signal, according to an embodiment of this disclosure.

FIG. 4A illustrates an electrical path according to an embodiment of this disclosure. FIG. 4B illustrates an electrical path according to an embodiment of this disclosure.

Referring to FIG. 4A, the electronic device 100 (or a first antenna 540 of FIG. 5) may transmit/receive a signal in a first frequency band through a first path ①. For example, the electronic device 100 may transmit/receive a signal in a low band and/or a high band through the first path ①.

According to an embodiment, the first path ① may be formed through the connection member 120. For example, the electronic device 100 may feed a first point 411 on the printed circuit board 130. Since the first point 411 is connected with a second point 412 on the first conductive region 111 through the connection element 132 (e.g., a C-clip), the fed current may flow from the first point 411 to the second point 412. For another example, since the first conductive region 111 is formed of a conductive material, the fed current may flow from the second point 412 to a third point 413 and a fourth point 414.

According to an embodiment, the third point 413 and the fourth point 414 may be in contact with the third metal pad 233 and the first metal pad 231, respectively. The third metal pad 233 and the first metal pad 231 may be connected with the second metal pad 232 through the at least one circuit element 261 or 262. The second metal pad 232 may be electrically connected with a fifth point 415 on the second conductive region 112. For example, the fed current may flow from the third point 413 and the fourth point 414 to the second conductive region 112 through the third metal pad 233, the first metal pad 231, the circuit element 261 or 262, the second metal pad 232, and the fifth point 415.

Referring to FIG. 4B, the electronic device 100 (or a second antenna 550 of FIG. 5) may transmit/receive a signal in a second frequency band through a second path ②. For example, the electronic device 100 may transmit/receive a signal in a mid band through the second path ②.

According to an embodiment, the second path ② may be formed through the connection member 120. For example, the electronic device 100 may feed a "a" point 421 on the printed circuit board 130. Since the "a" point 421 is connected with a "b" point 422 on the first conductive region 111 through a connection element 431 (e.g., a C-clip), the fed current may flow from the "a" point 421 to the "b" point 422. For another example, since the first conductive region 111 is formed of a conductive material, the fed current may flow from the "b" point 422 to a "c" point 423 and a "d" point 424.

According to an embodiment, the "c" point 423 and the "d" point 424 may be in contact with the first metal pad 231 and the third metal pad 233, respectively. The first metal pad 231 and the third metal pad 233 may be connected with the second metal pad 232 through the at least one circuit element 261 or 262. The second metal pad 232 may be electrically connected with an "e" point 425 on the second conductive region 112. For example, the fed current may flow from the "c" point 423 and the "d" point 424 to the second conductive region 112 through the first metal pad 231, the third metal pad 233, the at least one circuit element 261 or 262, the second metal pad 232, and the "e" point 425.

Figure 5:
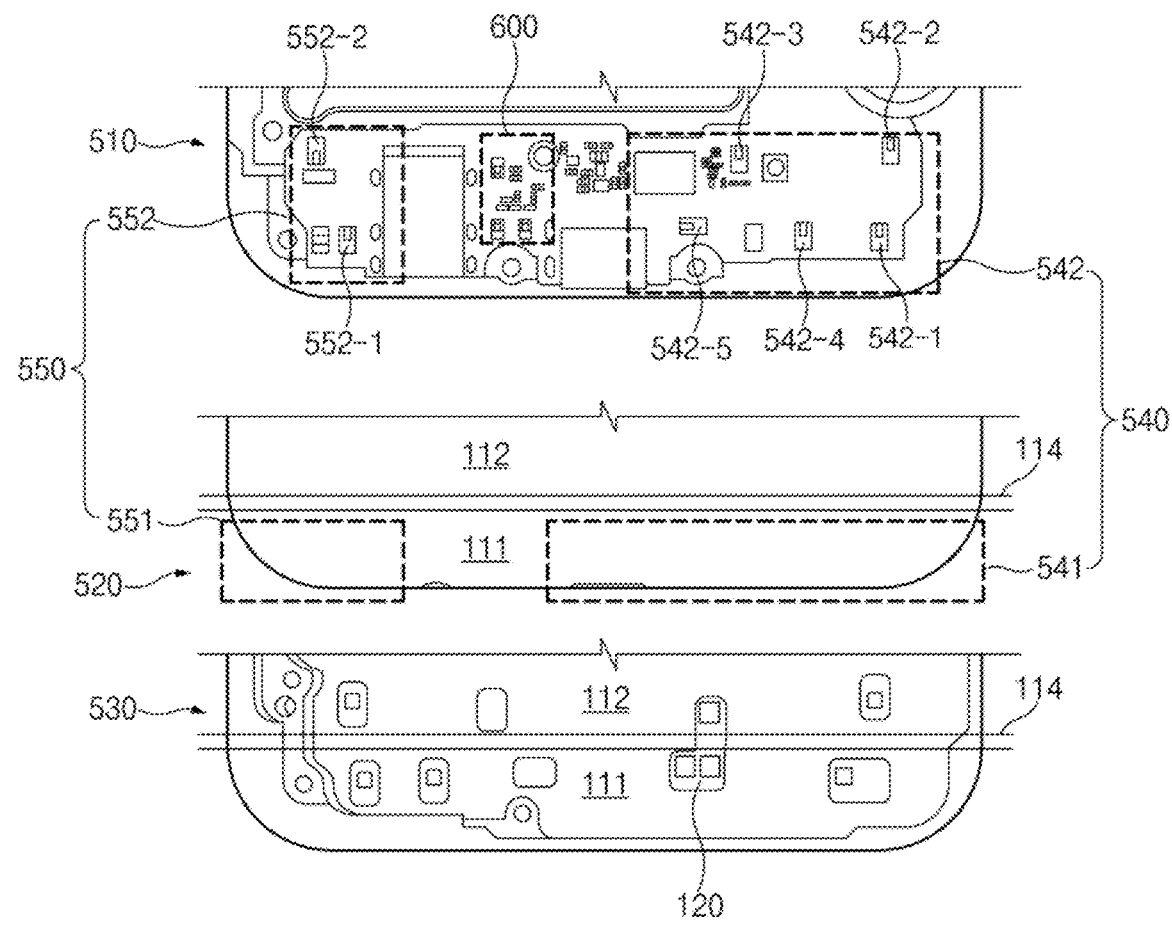
FIG. 5 illustrates one surface of a printed circuit board, and one surface and an opposite surface of a rear housing, according to an embodiment of this disclosure.

FIG. 5 illustrates one surface of the printed circuit board 130, and one surface and an opposite surface of the rear housing 110, according to an embodiment of this disclosure.

One surface 510 of the printed circuit board 130 may mean a surface coupled with the rear housing 110. One surface 520 of the rear housing 110 may mean a surface which is opposite to a surface coupled with the printed circuit board 130, and an opposite surface of the rear housing 110 may mean the surface coupled with the printed circuit board 130.

Referring to FIG. 5, the electronic device 100 may include the first antenna 540 and the second antenna 550. For example, the first antenna 540 may include an "a" region 541 (e.g., a portion of the first conductive region 111), a feeding point 542-1, and a plurality of ground points 542-2, 542-3, 542-4, and 542-5. For example, connection elements (e.g., a C-clip) may be positioned at the feeding point 542-1 and the plurality of ground points 542-2, 542-3, 542-4, and 542-5. For example, the "a" region 541 may be connected with the feeding point 542-1 and the plurality of ground points 542-2, 542-3, 542-4, and 542-5 through the connection elements.

According to an embodiment, the first antenna 540 may be connected with the second conductive region 112 through the connection member 120. The second conductive region 112 may be, for example, a ground region of the first antenna 540. For example, the first antenna 540 may transmit/receive a signal of the first frequency band through the first path ①. For example, the first antenna 540 may transmit/receive a signal in the low band and/or the high band through the first path ①.

According to an embodiment, the second antenna 550 may include a "b" region (a portion of the remaining region of the first conductive region 111 other than the "a" region 541), a feeding point 552-1, and a ground point 552-2. For example, connection elements (e.g., a C-clip) may be positioned at the feeding point 552-1 and the ground point 552-2. For example, a "b" region 551 may be connected with the feeding point 552-1 and the ground point 552-2 through the connection elements.

According to an embodiment, the second antenna 550 may be connected with the second conductive region 112 through the connection member 120. The second conductive region 112 may be, for example, a ground region of the second antenna 550. For example, the second antenna 550 may transmit/receive a signal in the second frequency band through the second path ② illustrated in FIG. 4B. For example, the second antenna 550 may transmit/receive a signal in the mid band through the second path ②.

According to an embodiment of the present disclosure, the first conductive region 111 and the second conductive region 112 may be electrically connected through the connection member 120 in the electronic device 100 including the metal rear housing 110. For example, the ground region of the first antenna 540 and the second antenna 550 may be expanded, and thus, the isolation between the first antenna 540 and the second antenna 550 may increase.

Figure 6:
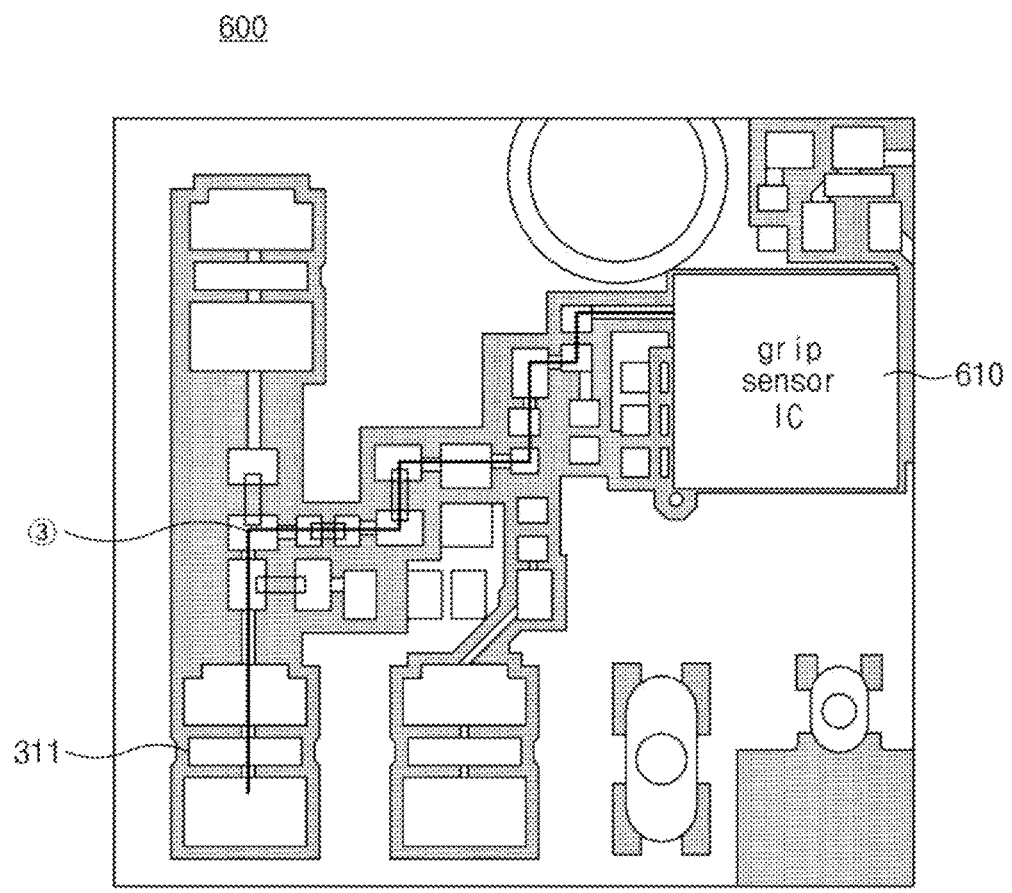
FIG. 6 illustrates an enlarged view of a partial region of a printed circuit board according to an embodiment of this disclosure.

FIG. 6 illustrates an enlarged view of a partial region of a printed circuit board according to an embodiment of this disclosure. A partial region 600 illustrated in FIG. 6 may mean a region of FIG. 5, at which the printed circuit board 130 and the connection member 120 are coupled.

Referring to FIG. 6, a grip sensor circuit 610 may be electrically connected with the first conductive region 111 and the second conductive region 112 through a third path ③. For example, the third path ③ may mean an electrical path extending from the grip sensor circuit 610 to the first conductive region 111 and the second conductive region 112 through the first connection element 311 and the first metal pad 231. For example, the grip sensor circuit 610 may be connected with the first connection element 311, and the first connection element 311 may be in contact with the first metal pad 231 when the connection member 120 is coupled to the printed circuit board 130. The first metal pad 231 may be in contact with the first conductive region 111, and may be electrically connected with the second conductive region 112 through the at least one circuit element 261 or 262. For example, the grip sensor circuit 610 may be electrically connected with the first conductive region 111 and the second conductive region 112 through the first connection element 311 and the first metal pad 231.

According to an embodiment, the grip sensor circuit 610 may sense whether a user approaches the electronic device 100 or whether a touch (or a grip) of the user is made, based on a capacitance on the third path ③. For example, the capacitance may change when the user approaches the electronic device 100 or when the user touches the electronic device 100. The grip sensor circuit 610 may sense whether the user approaches the electronic device 100 or touches the electronic device 100, based on the variation in capacitance.

According to an embodiment, the sensing performance of the grip sensor circuit 610 may increase as the capacitance of the circuit element 261 or 262 becomes smaller. For example, the capacitance of the second conductive region 112 may be very great. For this reason, the grip sensor circuit 610 may be insensitive to the change (or variation) in capacitance in the case where an electromagnetic effect between the second conductive region 112 and the grip sensor circuit 610 increases. For another example, in the case where the capacitance of the circuit element 261 or 262 is small, the electromagnetic effect between the grip sensor circuit 610 and the second conductive region 112 may decrease, and thus, the grip sensor circuit 610 may sensitively sense the change (or variation) in capacitance.

According to an embodiment of the present disclosure, the performance of a grip sensor may be improved by inserting the connection member 120 in the electronic device 100 including the metal rear housing 110.

Figure 7A:
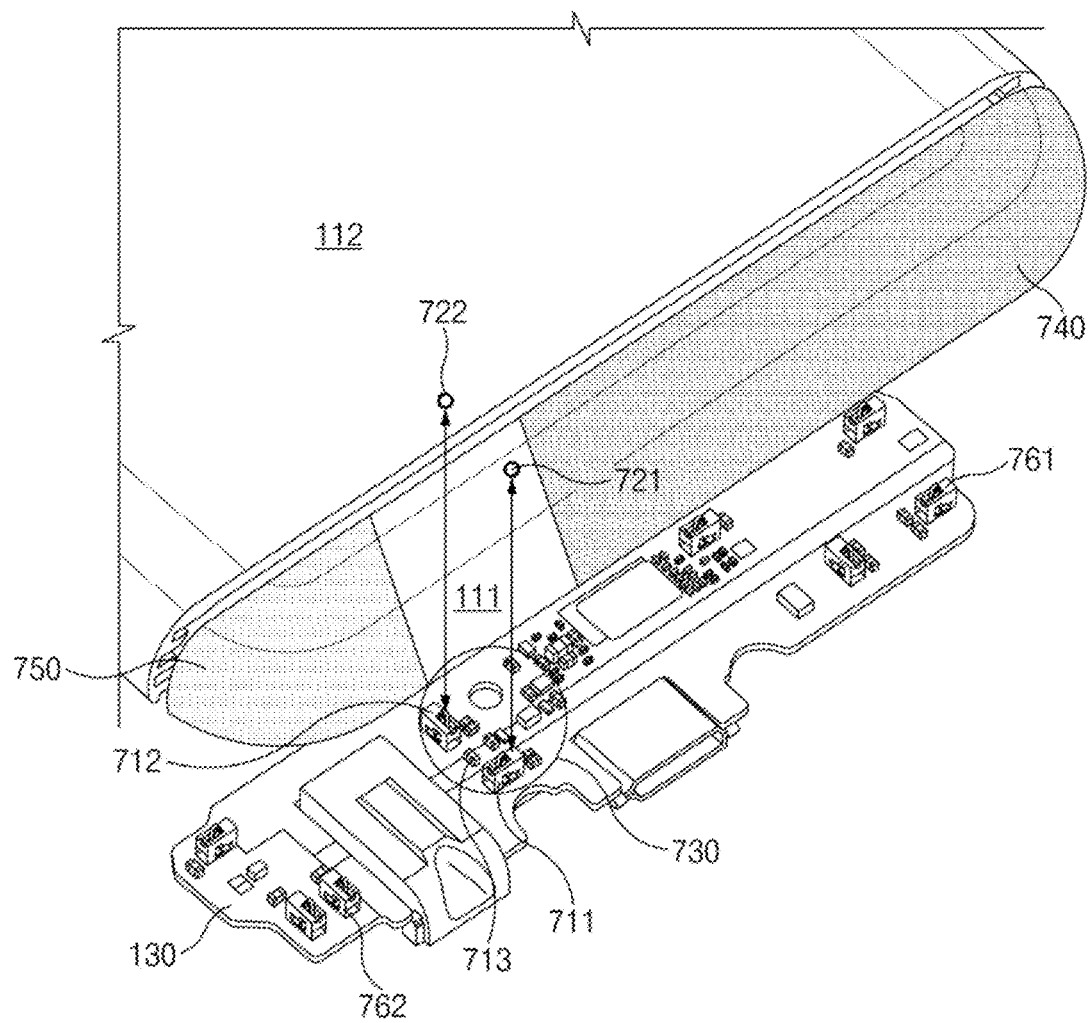
FIG. 7A illustrates a coupling shape of a printed circuit board and a rear housing according to an embodiment of this disclosure.
Figure 7B:
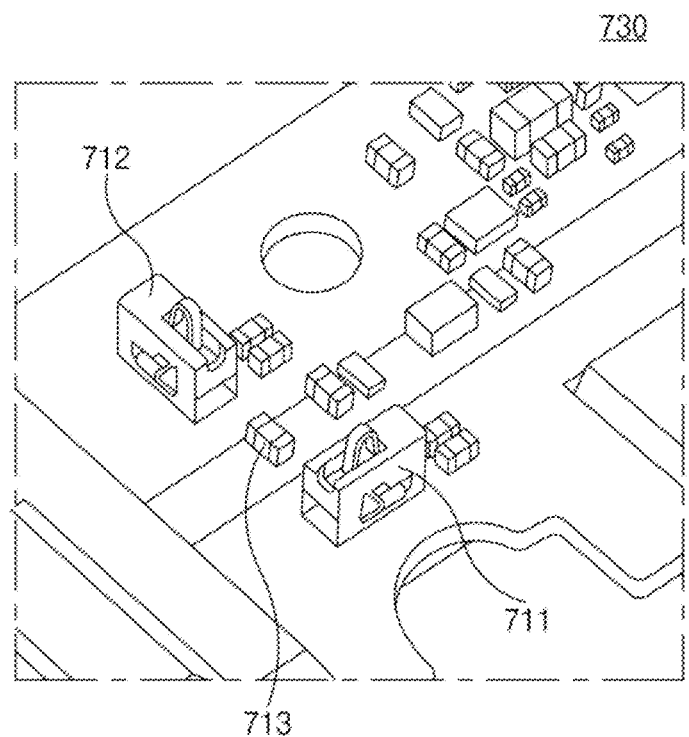
FIG. 7B illustrates an enlarged view of a partial region of a printed circuit board according to an embodiment of this disclosure.

FIG. 7A illustrates a coupling shape of a printed circuit board and a rear housing according to an embodiment of this disclosure. FIG. 7B illustrates an enlarged view of a partial region of a printed circuit board according to an embodiment of this disclosure. FIG. 7B is an enlarged view of a partial region 730 illustrated in FIG. 7A. An electronic device 700 illustrated in FIG. 7A may indicate an electronic device in which, instead of the connection member 120 of the electronic device 100 described with reference to FIGS. 1 to 6, connection elements 711 and 712 and a circuit element 713 are positioned on the printed circuit board 130.

Referring to FIGS. 7A and 7B, the electronic device 700 may include the plurality of connection elements 711 and 712 (e.g., a C-clip) and the at least one circuit element 713 (e.g., a capacitor or a varistor), which are positioned on the printed circuit board 130. According to an embodiment, a position where the plurality of connection elements 711 and 712 and the at least one circuit element 713 are positioned may correspond to a position where the connection member 120 is coupled on the printed circuit board 130 in FIG. 3.

According to an embodiment, the first conductive region 111 and the second conductive region 112 may be electrically connected through the plurality of connection elements 711 and 712 and the at least one circuit element 713. For example, the first connection element 711 may be in contact with one point 721 of the first conductive region 111, and the second connection element 712 may be in contact with one point 722 of the second conductive region 112. For example, the circuit element 713 may be interposed between the first connection element 711 and the second connection element 712, and may be connected with the first connection element 711 and the second connection element 712 through a specified wiring. For example, the first conductive region 111 may be connected with the second conductive region 112 through the first connection element 711, the circuit element 713, and the second connection element 712.

According to an embodiment, a first antenna 740 may transmit/receive a signal in the first frequency band (e.g., the low band and/or the high band). For example, the wireless communication circuit 131 may feed a first feeding point 761. The fed current may flow to the second conductive region 112 through the first conductive region 111, the first connection element 711, the circuit element 713, and the second connection element 712. The first antenna 740 may transmit/receive a signal in the first frequency band based on a path through which the fed current flows. In the present disclosure, except for the description given with regard to the connection member 120, the description given with regard to the first antenna 540 may also be applied to the first antenna 740 (illustrated in FIG. 7A).

According to an embodiment, a second antenna 750 may transmit/receive a signal in the second frequency band (e.g., the mid band). For example, the wireless communication circuit 131 may feed a second feeding point 762. The fed current may flow to the second conductive region 112 through the first conductive region 111, the first connection element 711, the circuit element 713, and the second connection element 712. The second antenna 750 may transmit/receive a signal in the second frequency band based on a path through which the fed current flows. In the present disclosure, except for the description given with regard to the connection member 120, the description given with regard to the second antenna 550 may also be applied to the second antenna 750 (illustrated in FIG. 7A).

Figure 8A:
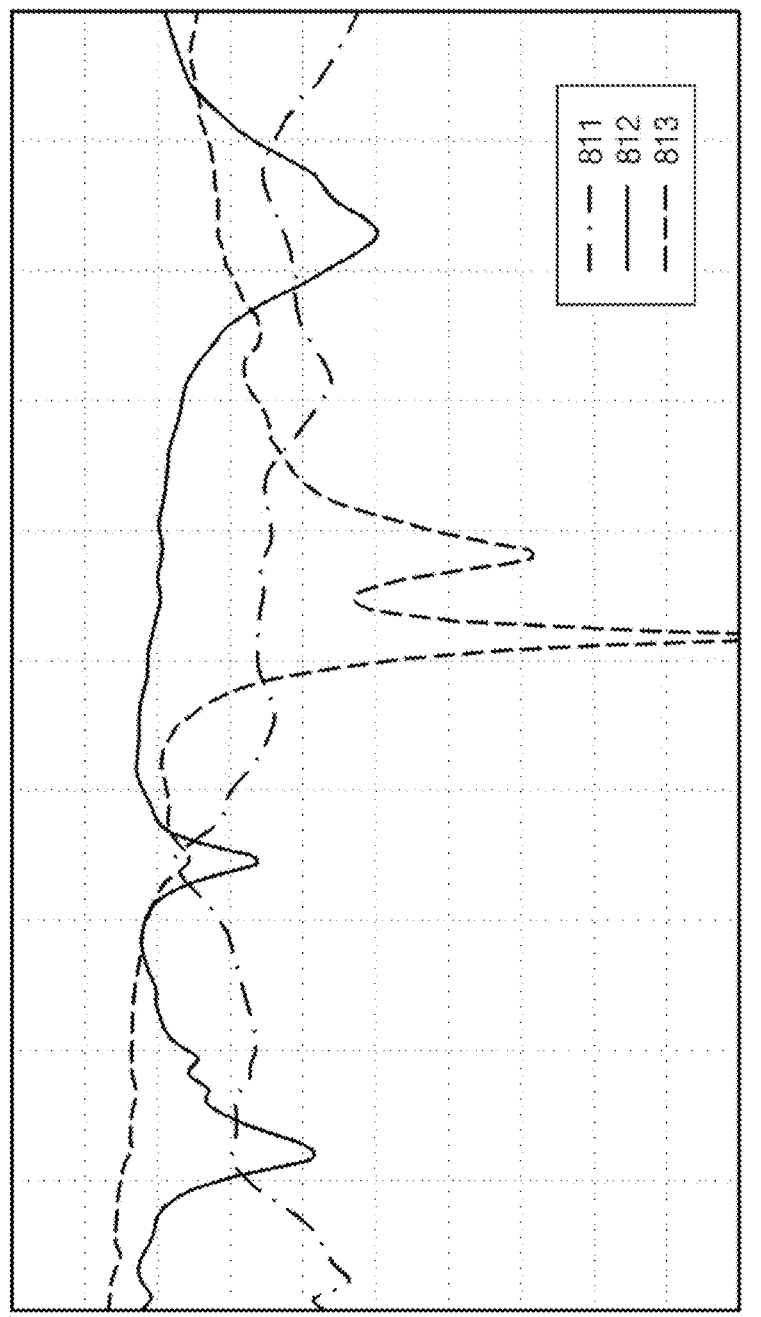
FIG. 8A illustrates an isolation of antennas and a reflection coefficient of each antenna, according to an embodiment of this disclosure.
Figure 8B:
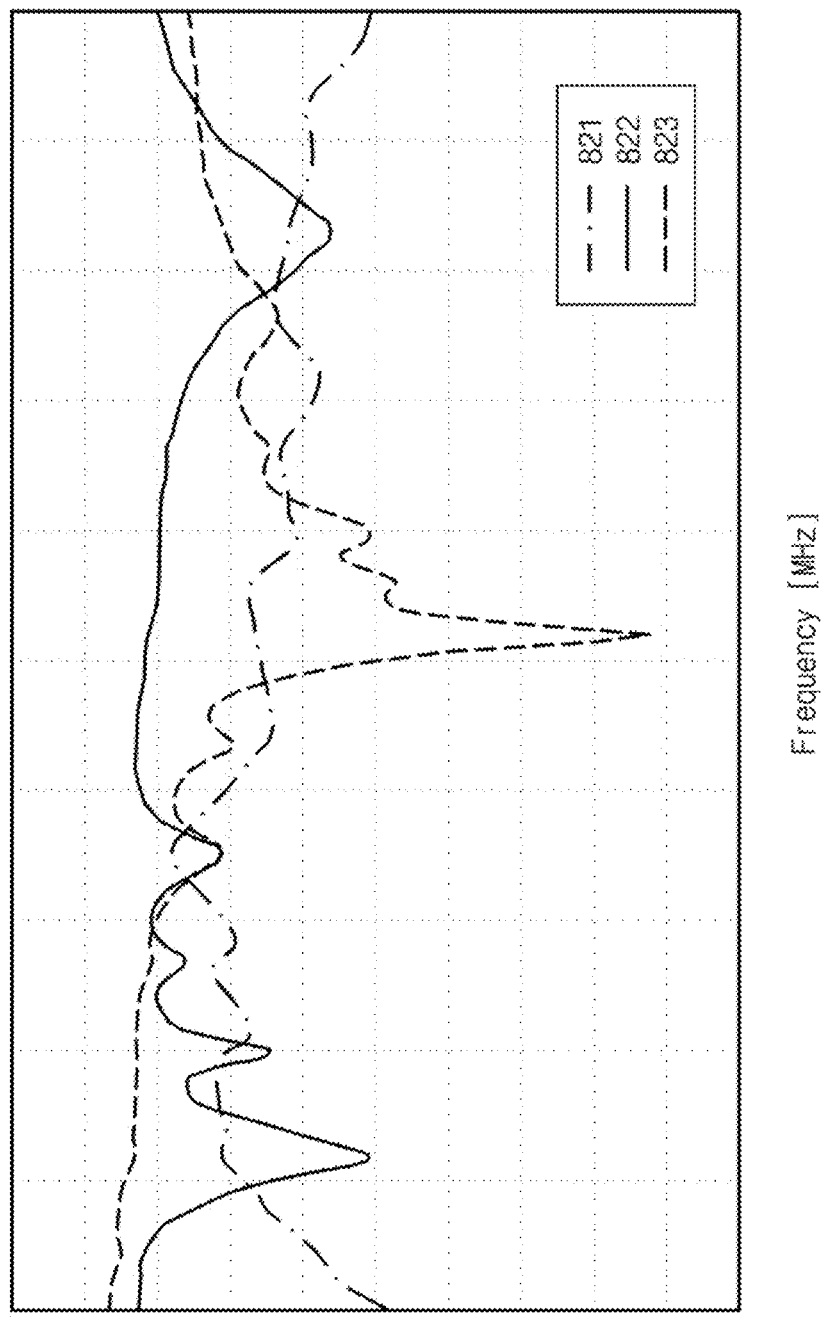
FIG. 8B illustrates an isolation of antennas and a reflection coefficient of each antenna, according to an embodiment of this disclosure.

FIG. 8A illustrates an isolation of antennas and a reflection coefficient of each antenna, according to an embodiment of this disclosure. FIG. 8B illustrates an isolation of antennas and a reflection coefficient of each antenna, according to an embodiment of this disclosure. FIG. 8C illustrates an isolation of antennas and a reflection coefficient of each antenna, according to an embodiment of this disclosure. FIG. 8D illustrates an isolation of antennas and a reflection coefficient of each antenna, according to an embodiment of this disclosure.

In FIG. 8A, a graph 811 represents an isolation of the first antenna 540 and the second antenna 550 in the electronic device 100 illustrated in FIG. 1, a graph 812 represents a reflection coefficient of the first antenna 540, and a graph 813 represents a reflection coefficient of the second antenna 550.

In FIG. 8B, a graph 821 represents an isolation of the first antenna 740 and the second antenna 750 in the electronic device 700 illustrated in FIG. 7A, a graph 822 represents a reflection coefficient of the first antenna 740, and a graph 823 represents a reflection coefficient of the second antenna 750.

Graphs 831, 832, and 833 illustrated in FIG. 8C represent an isolation of the antennas 540 and 550 and a reflection coefficient of each of the antenna 540 and the antenna 550 in the case where the first metal pad 231 or the third metal pad 233 is removed from the electronic device 100 illustrated in FIG. 1 (hereinafter referred to as a "first case"). For example, in an electronic device which does not include the first metal pad 231 or the third metal pad 233, the graph 831 represents an isolation of the first antenna 540 and the second antenna 550, a graph 832 represents a reflection coefficient of the first antenna 540, and a graph 833 represents a reflection coefficient of the second antenna 550.

Graphs 841, 842, and 843 illustrated in FIG. 8D represent an isolation of the antennas 540 and 550 and a reflection coefficient of each of the antenna 540 and the antenna 550 in the case where the connection member 120 is removed from the electronic device 100 illustrated in FIG. 1 (hereinafter referred to as a "second case"). For another example, the graphs 841, 842, and 843 illustrated in FIG. 8D represent an isolation of the antennas 740 and 750 and a reflection coefficient of each of the first antenna 740 and the second antenna 750 in the case where the connection elements 711 and 712 and the circuit element 713 are removed from the electronic device 700 illustrated in FIG. 7A.

It may be understood from FIGS. 8A to 8D that the electronic device 100 is most excellent in the case of the isolation. It may be understood that an isolation is excellent compared with the first case or the second case even in the case of the electronic device 700 illustrated in FIG. 7A. For example, as understood from FIGS. 8A to 8D, when a ground region of an antenna does not exist or as a ground region of an antenna becomes smaller, a parasitic resonance may increase, and the isolation between the antennas 540 and 550 or 740 and 750 may decrease.

It may be understood from a result of comparing reflection coefficients of the antennas 540 and 550 or 740 and 750 that the electronic device 100 is the most excellent. For example, the first antenna 540 and the second antenna 550 may have excellent performance in the low band, the mid band, or the high band without a parasitic resonance.

It may be understood that the performance of the electronic device 700 illustrated in FIG. 7A is somewhat lower than the performance of the electronic device 100, but the electronic device 700 has excellent performance compared with the first case or the second case. For example, it may be understood that a parasitic resonance occurring in the second antenna 750 is greater than a parasitic resonance occurring in the second antenna 550 and reflection coefficients of the first antenna 740 and the second antenna 750 are greater than reflection coefficients of the first antenna 540 and the second antenna 550.

It may be understood that the first case and the second case have very unstable performance compared to the electronic device 100 and the electronic device 700. For example, it may be understood that, when a ground region of an antenna does not exist or as a ground region of an antenna becomes smaller, a parasitic resonance increases, and a reflection coefficient becomes greater.

Figure 9A:
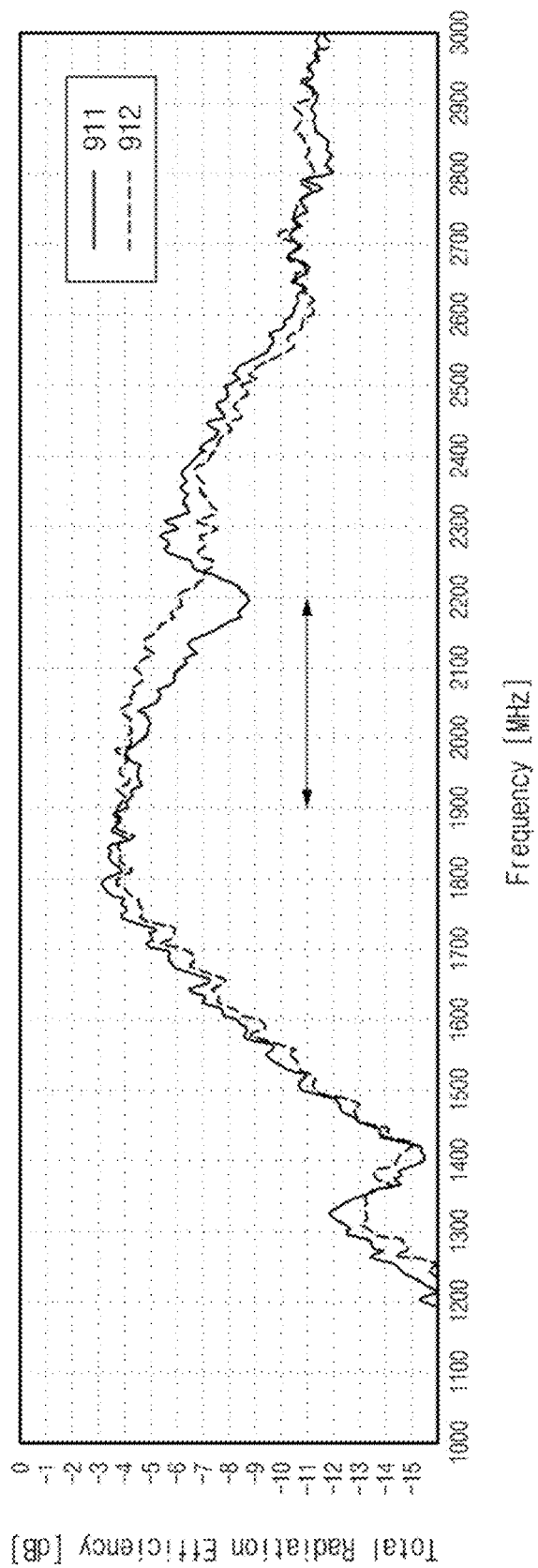
FIG. 9A illustrates a radiation efficiency of an antenna according to an embodiment of this disclosure.
Figure 9B:
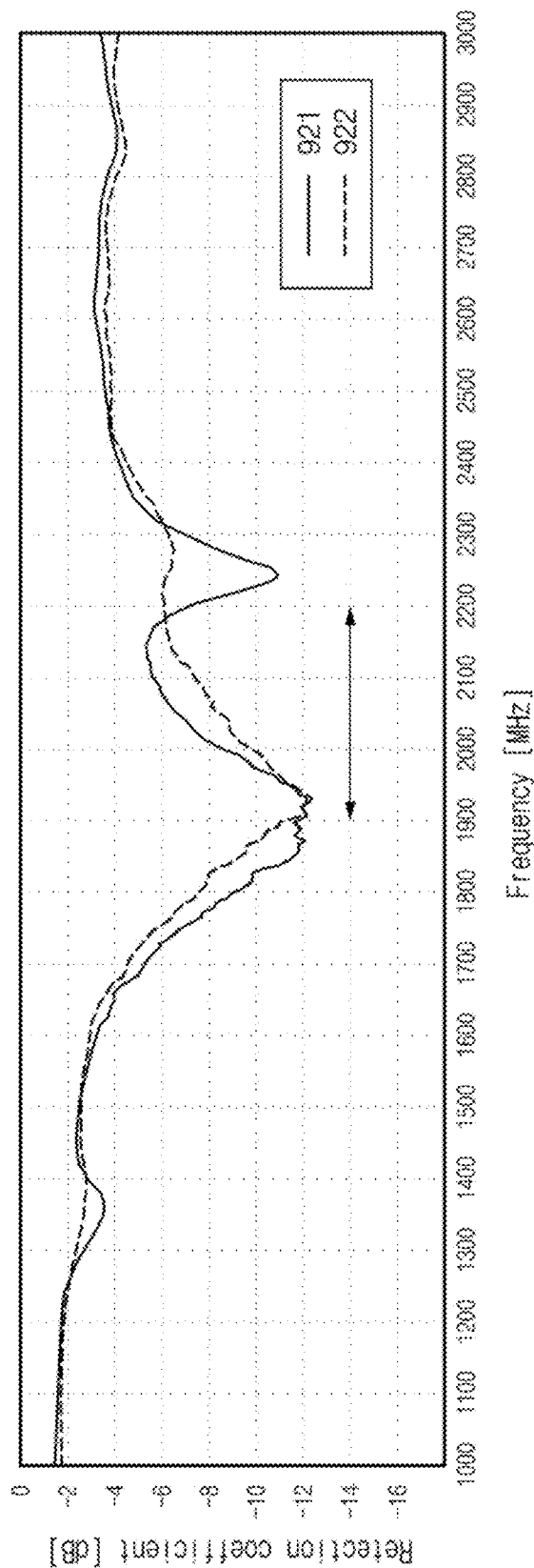
FIG. 9B illustrates a reflection coefficient of an antenna according to an embodiment of this disclosure.

FIG. 9A illustrates a radiation efficiency of an antenna according to an embodiment of this disclosure. FIG. 9B illustrates a reflection coefficient of an antenna according to an embodiment of this disclosure.

In FIG. 9A, a graph 911 represents a radiation efficiency of the second antenna 550 in the case where the connection member 120 is absent from the electronic device 100, and a graph 912 represents a radiation efficiency of the second antenna 550 according to an embodiment of the present disclosure. In FIG. 9B, a graph 921 represents a reflection coefficient of the second antenna 550 in the case where the connection member 120 is absent from the electronic device 100, and a graph 922 represents a reflection coefficient of the second antenna 550 according to an embodiment of the present disclosure.

Referring to FIG. 9A, in the case where the connection member 120 is inserted into the electronic device 100, a radiation efficiency of the second antenna 550 may increase. For example, a radiation efficiency of the second antenna 550 may increase in the mid band (e.g., approximately 1900 MHz to approximately 2200 MHz) after inserting the connection member 120. According to an embodiment of the present disclosure, as the connection member 120 is inserted into the electronic device 100, the second conductive region 112 of the rear housing 110 may be used as a ground region of the second antenna 550. As such, the radiation efficiency of the antenna 550 may increase.

Referring to FIG. 9B, in the case where the connection member 120 is inserted into the electronic device 100, a reflection coefficient of the second antenna 550 may decrease. For example, a reflection coefficient of the second antenna 550 may decrease in the mid band (e.g., approximately 1900 MHz to approximately 2200 MHz) after inserting the connection member 120. According to an embodiment of the present disclosure, as the connection member 120 is inserted into the electronic device 100, the second conductive region 112 of the rear housing 110 may be used as a ground region of the antenna 550. As such, the reflection coefficient of the antenna 550 may decrease.

The electronic device 100 according to an embodiment of the present disclosure may include a housing that includes a cover glass 150 through which at least a portion of a display 140 is exposed, and a rear housing 110 coupled with the cover glass 150, wherein the rear housing 110 includes a first conductive region 111, a second conductive region 112 physically spaced from the first conductive region 111, and a non-conductive region (insulating material) 114 interposed between the first conductive region 111 and the second conductive region 112, a printed circuit board 130 that is positioned within the housing, a wireless communication circuit 131 that is positioned on the printed circuit board 130 and is electrically connected with the first conductive region 111, a grip sensor circuit 610 that is positioned on the printed circuit board 130 and is electrically connected with the first conductive region 111, and a connection member 120 that is interposed between the printed circuit board 130 and the rear housing 110 and electrically connects the first conductive region 111 and the second conductive region 112. The wireless communication circuit 131 may feed the first conductive region 111 and may transmit/receive a signal in a specified frequency band based on a first electrical path formed through the first conductive region 111, the connection member 120, and the second conductive region 112, and the grip sensor circuit 610 may sense whether a user approaches the electronic device 100 or whether the user touches the housing, based on a capacitance on a second electrical path connected to the grip sensor circuit 610 from the first conductive region 111 and the second conductive region 112 through the connection member 120.

The connection member 120 according to an embodiment of the present disclosure may include a first metal pad 231 connected with the first conductive region 111 and a second metal pad 232 connected with the second conductive region 112, and may include at least one circuit element 261 or 262 interposed between the first metal pad 231 and the second metal pad 232.

The electronic device 100 according to an embodiment of the present disclosure may further include a first connection element 311 and a second connection element 312 positioned on the printed circuit board 130, and the first metal pad 231 and the second metal pad 232 may be respectively coupled with the first connection element 311 and the second connection element 312.

The wireless communication circuit 131 according to an embodiment of the present disclosure may transmit/receive the signal of the specified frequency band based on an electrical path formed through the first conductive region 111, the first metal pad 231, the at least one circuit element 261 or 262, the second metal pad 232, and the second conductive region 112.

The connection member 120 according to an embodiment of the present disclosure may further include a third metal pad 233 connected with the first conductive region 111, and at least one circuit element interposed between the third metal pad 233 and the second metal pad 232.

The wireless communication circuit 131 according to an embodiment of the present disclosure may feed a first point 412 on the first conductive region 111 and may transmit/receive a signal of a first frequency band based on an electrical path formed through the first point 412, the first metal pad 231, the at least one circuit element 261 or 262, the second metal pad 232, and the second conductive region 112, and the wireless communication circuit 131 may feed a second point 422 on the first conductive region 111 and transmits/receives a signal of a second frequency band based on an electrical path formed through the second point 422, the first metal pad 231, the at least one circuit element 262 or 262, the second metal pad 232, and the second conductive region 112.

The first point 411 according to an embodiment of the present disclosure may be positioned to face the second point 421 with respect to the connection member 120.

The first frequency band according to an embodiment of the present disclosure may be lower than the second frequency band.

The grip sensor circuit 610 according to an embodiment of the present disclosure may sense whether the user approaches the electronic device 100 or whether the user touches the housing, based on a capacitance on a path formed through the first metal pad 231 and the at least one circuit element 261 or 262.

The at least one circuit element 261 or 262 may correspond to a capacitor or a varistor, and a capacitance of the at least one circuit element 261 or 262 may be smaller than a capacitance of the second conductive region 112.

An adhesive material 250 for attaching the connection member 120 to the housing may be positioned on one surface of the connection member 120.

The rear housing 110 according to an embodiment of the present disclosure may further include a third conductive region 113 that is physically connected with the second conductive region 112.

The specified frequency band according to an embodiment of the present disclosure may correspond to a first frequency band, and the wireless communication circuit 131 may feed the third conductive region 113 and may transmit/receive a signal of a second frequency band based on an electrical path formed through the third conductive region 113.

At least a portion of the rear housing 110 according to an embodiment of the present disclosure may be formed of a conductive material.

The electronic device 100 according to an embodiment of the present disclosure may include a housing that includes a cover glass 150 through which at least a portion of a display 140 is exposed, and a rear housing 110 coupled with the cover glass 150, wherein the rear housing 110 includes a first conductive region 111, a second conductive region 112 physically spaced from the first conductive region 111, and a non-conductive region (insulating material) 114 interposed between the first conductive region 111 and the second conductive region 112, a printed circuit board 130 that is positioned within the housing, a wireless communication circuit 131 that is positioned on the printed circuit board 130 and is electrically connected with the first conductive region 111, a grip sensor circuit 610 that is positioned on the printed circuit board 130 and is electrically connected with the first conductive region 111, and a plurality of connection elements 711 and 712 that are positioned on a path electrically connecting the first conductive region 111 and the second conductive region 112. The wireless communication circuit 131 may feed the first conductive region 111, and may transmit/receive a signal in a specified frequency band based on an electrical path formed through the first conductive region 111, the plurality of connection elements 711 and 712, and the second conductive region 112, and the grip sensor circuit 610 may sense whether a user approaches the electronic device 100 or whether the user touches the housing, based on a capacitance on an electrical path connected to the grip sensor circuit 610 from the first conductive region 111 and the second conductive region 112 through the plurality of connection elements 711 and 712.

The plurality of connection elements 711 and 712 according to an embodiment of the present disclosure may include a first metal clip 711 that is positioned at a first point on the printed circuit board 130, a second metal clip 712 that is positioned at a second point on the printed circuit board 130, and at least one circuit element 713 that is interposed between the first metal clip 711 and the second metal clip 712.

The first point according to an embodiment of the present disclosure may correspond to one point on the printed circuit board 130, which corresponds to the first conductive region 111, and the second point may correspond to one point on the printed circuit board 130, which corresponds to the second conductive region 112.

The wireless communication circuit 131 according to an embodiment of the present disclosure may transmit/receive the signal of the specified frequency band based on an electrical path formed through the first conductive region 111, the first metal clip 711, the circuit element 713, the second metal clip 712, and the second conductive region 112.

The grip sensor circuit 610 according to an embodiment of the present disclosure may sense whether the user approaches the electronic device 100 or whether the user touches the housing, based on a capacitance on an electrical path formed through the first metal clip 711 and the at least one circuit element 713.

At least a portion of the first conductive region 111 and at least a portion of the second conductive region 112, according to an embodiment of the present disclosure, may include a conductive material.

The electronic device 100 according to an embodiment of the present disclosure may include a housing that includes a cover glass 150 and a rear housing 110 facing the cover glass 150, wherein the rear housing 110 includes a first conductive region 111 including a first edge, a second conductive region 112 including a second edge adjacent to the first edge, and a first non-conductive region 114 electrically separating the first conductive region 111 and the second conductive region 112, and wherein the first non-conductive region 114 extends from the first edge to the second edge so as to contact the first and second edges and is interposed between the first edge and the second edge, a display 140 that is interposed between the cover glass 150 and the rear housing 110 and is exposed through the cover glass 150, a printed circuit board 130 that is interposed between the cover glass 150 and the rear housing 110, a wireless communication circuit 131 that is mounted on the printed circuit board 130 and is electrically connected with a first point of the first conductive region 111, and an connection member 120 that includes a first end electrically connected with a second point of the first conductive region 111 and a second end electrically connected with one point of the second conductive region 112 and includes at least one circuit element 261 or 262 electrically connecting the first end and the second end.

The circuit element 261 or 262 according to an embodiment of the present disclosure may include a capacitor or a varistor.

The connection member 120 according to an embodiment of the present disclosure may further include a structure including a first metal pad 231 being in contact with the second point of the first conductive region 111, and a second metal pad 232 being in contact with the one point of the second conductive region 112.

The at least one circuit element 261 or 262 according to an embodiment of the present disclosure may electrically connect the first metal pad 231 and the second metal pad 232.

The structure according to an embodiment of the present disclosure may further include a third metal pad 233 being in contact with a third point of the first conductive region 111, and a distance between the third metal pad 233 and the first metal pad 231 may be shorter than a distance between the second metal pad 232 and the first metal pad 231.

The structure according to an embodiment of the present disclosure may be mounted on the printed circuit board 130.

The connection member 120 according to an embodiment of the present disclosure may form a portion of the printed circuit board 130.

The electronic device 100 according to an embodiment of the present disclosure may further include a capacitive grip sensor circuit 610 electrically connected with the first conductive region 111.

Figure 10:
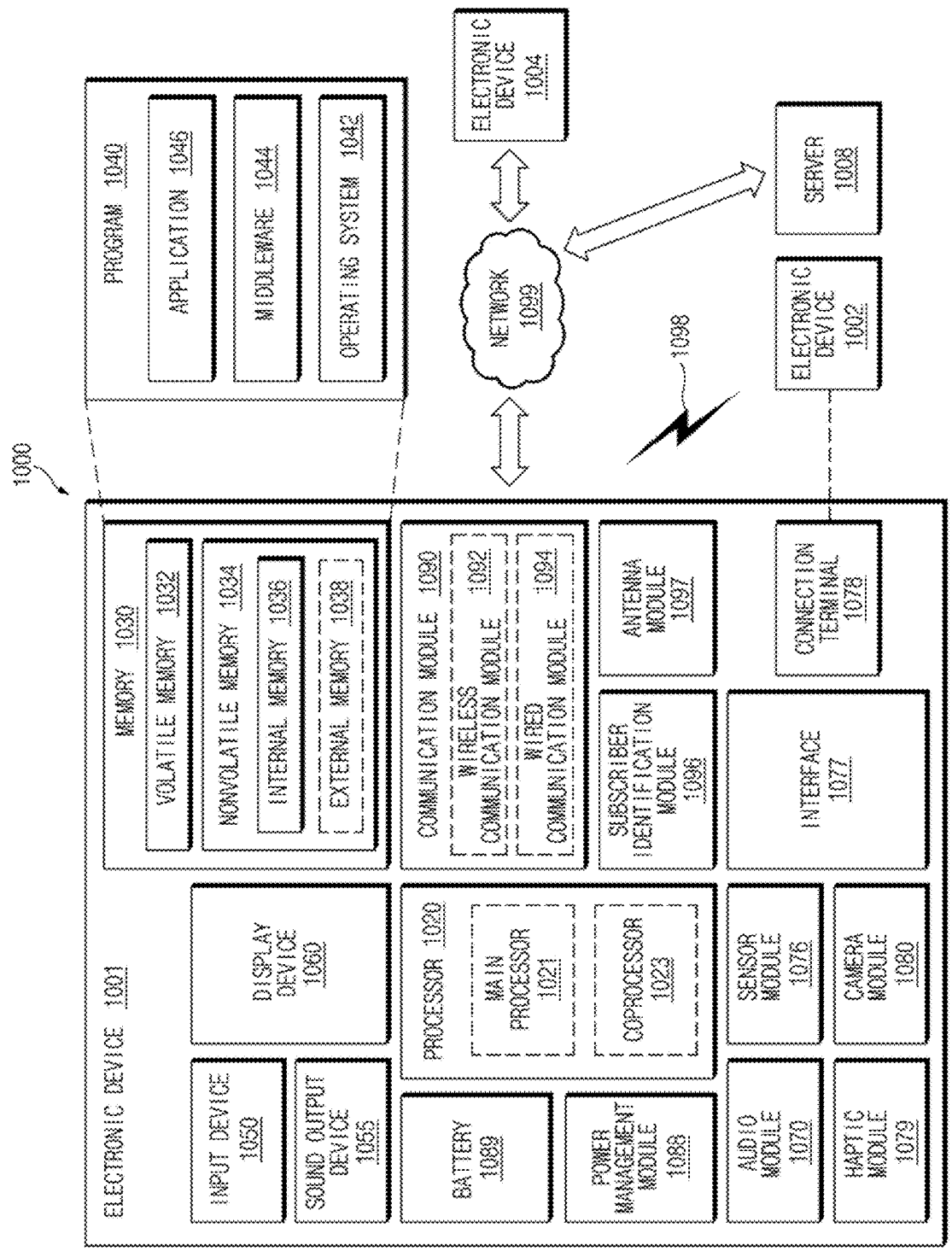
FIG. 10 illustrates a block diagram of an electronic device in a network environment, according to an embodiment of this disclosure.

FIG. 10 illustrates a block diagram of an electronic device in a network environment according to an embodiment of this disclosure.

Referring to FIG. 10, an electronic device 1001 (e.g., the electronic device 100 of FIG. 1) may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an coprocessor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the coprocessor 1023 may operate separately from the main processor 1021 or embedded.

In this case, the coprocessor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the coprocessor 1023 (e.g., the image signal processor or the communication processor) may be implemented as a part of another component (e.g., the camera module 1080 or the communication module 1090) that is functionally related to the coprocessor 1023. The memory 1030 may store a variety of data used by at least one component (e.g., the processor 1020 or the sensor module 1076) of the electronic device 1001, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connection terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an infrared data association (IrDA)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a general purpose input/output (GPIO)), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

Figure 11:
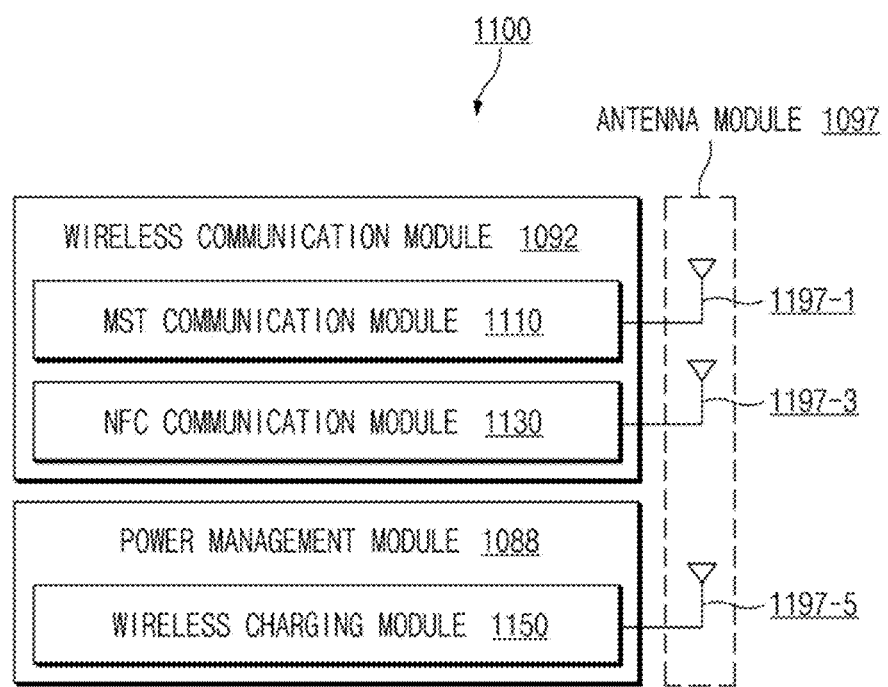
FIG. 11 illustrates a block diagram of a wireless communication module, a power management module, and an antenna module of an electronic device, according to an embodiment of this disclosure.

FIG. 11 illustrates a block diagram of a wireless communication module, a power management module, and an antenna module of an electronic device, according to an embodiment of this disclosure.

Referring to FIG. 11, the wireless communication module 1092 may include an MST communication module 1110 or an NFC communication module 1130, and the power management module 1088 may include a wireless charging module 1150. In this case, an antenna module 1197 may separately include a plurality of antennas including an MST antenna 1197-1 connected with the MST communication module 1110, an NFC antenna 1197-3 connected with the NFC communication module 1130, and a wireless charging antenna 1197-5 connected with the wireless charging module 1150. To avoid redundancy, additional description associated with components which are the same as the components of FIG. 10 will be omitted or will be briefly described.

The MST communication module 1110 may receive a signal (e.g., a signal including control information or payment information) from the processor 1020, may generate a magnetic signal corresponding to the received signal through the MST antenna 1197-1, and may transmit the generated magnetic signal to the external electronic device 1002 (e.g., a POS device). According to an embodiment, for example, the MST communication module 1110 may include a switching module (not illustrated) including one or more switches connected with the MST antenna 1197-1, and may control the switching module to change a direction of a voltage or a current to be supplied to the MST antenna 1197-1. A direction of a magnetic signal (e.g., a magnetic field) to be transmitted to the external electronic device 1002 through the short-range wireless communication 1098 may be changed, for example, by transmitting the magnetic signal through the MST antenna 1197-1. The magnetic signal transmitted with the direction changed may cause a form and an effect which are similar to those of a magnetic field generated while (or when) a magnetic card is swiped by a card reader of the electronic device 1002. According to an embodiment, payment-related information and a control signal received from the electronic device 1002 in the form of the magnetic signal may be transmitted, for example, to a server (e.g., the server 1008) through the network 1099.

The NFC communication module 1130 may obtain a signal (e.g., control information or payment information) from the processor 1020, and may transmit the obtained signal to the external electronic device 1002 through the NFC antenna 1197-3. According to an embodiment, the NFC communication module 1130 may receive a signal (e.g., a signal including control information or payment information) transmitted from the external electronic device 1002 through the NFC antenna 1197-3.

The wireless charging module 1150 may wirelessly transmit a power to the external electronic device 1002 (e.g., a mobile phone or a wearable device) through the wireless charging antenna 1197-5, or may wirelessly receive a power from the external electronic device 1002 (e.g., a wireless charging device). The wireless charging module 1150 may support various wireless charging manners, for example, including a magnetic resonance manner or a magnetic induction manner.

According to an embodiment, some of the MST antenna 1197-1, the NFC antenna 1197-3, or the wireless charging antenna 1197-5 may mutually share at least a portion of a radiation unit (or radiator). For example, a radiation unit of the MST antenna 1197-1 may be used as a radiation unit of the NFC antenna 1197-3 or the wireless charging antenna 1197-5, and vice versa. In the case where the MST antenna 1197-1, the NFC antenna 1197-3, or the wireless charging antenna 1197-5 shares at least a partial region of a radiation unit, the antenna module 1197 may include a switching circuit (not illustrated) for selectively connecting or separating (e.g., opening) at least some of the antennas 1197-1, 1197-3, and 1197-3 under control of the wireless communication module 1092 (e.g., the MST communication module 1110 or the NFC communication module 1130) or the power management module 1088 (e.g., the wireless charging module 1150). For example, in the case where the electronic device 1001 uses a wireless charging function, the NFC communication module 1130 or the wireless charging module 1150 may control the switching circuit such that the at least a partial region of the radiation unit shared by the NFC antenna 1197-3 and the wireless charging antenna 1197-5 is temporarily separated from the NFC antenna 1197-3 and is connected only with the wireless charging antenna 1197-5.

According to an embodiment, at least a part of functions of the MST communication module 1110, the NFC communication module 1130, or the Wireless charging module 1150 may be controlled by an external processor (e.g., the processor 1020). According to an embodiment, specified functions (e.g., a payment function) of the MST communication module 1110 or the NFC communication module 1130 may be performed in a trusted execution environment (TEE). The trusted execution environment (TEE) according to various embodiments may be, for example, an execution environment in which at least a portion of a specified region of the memory 1030 is assigned to perform a function (e.g., a financial transaction or a private information related function) needing a relatively high level of security and an access to the specified region is separately and restrictively allowed, for example, depending on an access subject or an application to be executed.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1040) including an instruction stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a PLAY STORE). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a rear housing including a first conductive region, a second conductive region physically spaced from the first conductive region, and an insulating material interposed between the first conductive region and the second conductive region;
   a printed circuit board;
   a wireless communication circuit positioned on the printed circuit board and electrically connected with the first conductive region; and
   a connection member interposed between the printed circuit board and the rear housing, and electrically connecting the first conductive region and the second conductive region, wherein the wireless communication circuit is configured to:
   feed the first conductive region; and
   transmit or receive a signal in a specified frequency band based on a first electrical path formed through the first conductive region, the connection member, and the second conductive region.

2. The electronic device of claim 1, wherein the connection member includes a first metal pad coupled with the first conductive region and a second metal pad coupled with the second conductive region, and includes a circuit element interposed between the first metal pad and the second metal pad.

3. The electronic device of claim 2, further comprising:
   a first connection element and a second connection element positioned on the printed circuit board, wherein the first metal pad and the second metal pad are respectively coupled with the first connection element and the second connection element.

4. The electronic device of claim 2, wherein the wireless communication circuit transmits or receives the signal of the specified frequency band based on an electrical path formed through the first conductive region, the first metal pad, the circuit element, the second metal pad, and the second conductive region.

5. The electronic device of claim 2, wherein the connection member further includes:
   a third metal pad coupled with the first conductive region; and
   an additional circuit element interposed between the third metal pad and the second metal pad.

6. The electronic device of claim 2, wherein the wireless communication circuit feeds a first point on the first conductive region and transmits or receives a signal of a first frequency band based on an electrical path formed through the first point, the first metal pad, the circuit element, the second metal pad, and the second conductive region, and
   wherein the wireless communication circuit feeds a second point on the first conductive region and transmits or receives a signal of a second frequency band based on the electrical path formed through the second point, the first metal pad, the circuit element, the second metal pad, and the second conductive region.

7. The electronic device of claim 6, wherein the first point is positioned to face the second point with respect to the connection member.

8. The electronic device of claim 6, wherein the first frequency band is lower than the second frequency band.

9. The electronic device of claim 2, further comprising:
   a grip sensor circuit positioned on the printed circuit board and electrically connected with the first conductive region,
   wherein the grip sensor circuit senses whether a user approaches the electronic device or whether the user touches the rear housing, based on a capacitance on a second electrical path connected to the grip sensor circuit from the first conductive region and the second conductive region through the connection member.

10. The electronic device of claim 9, wherein the grip sensor circuit senses whether the user approaches the electronic device or whether the user touches the rear housing, based on a capacitance on a path formed through the first metal pad and the circuit element.

11. The electronic device of claim 2, wherein the circuit element corresponds to a capacitor or a varistor, and
    wherein a capacitance of the circuit element is smaller than a capacitance of the second conductive region.

12. The electronic device of claim 1, wherein the rear housing further includes:
    a third conductive region physically connected with the second conductive region.

13. The electronic device of claim 12, wherein the specified frequency band corresponds to a first frequency band, and
    wherein the wireless communication circuit feeds the third conductive region and transmits or receives a signal of a second frequency band based on an electrical path formed through the third conductive region.

14. The electronic device of claim 1, wherein at least a portion of the rear housing is formed of a conductive material.

15. An electronic device comprising:
    a rear housing including a first conductive region, a second conductive region physically spaced from the first conductive region, and an insulating material interposed between the first conductive region and the second conductive region;
    a printed circuit board;
    a wireless communication circuit positioned on the printed circuit board and electrically connected with the first conductive region; and
    a plurality of connection elements positioned on a path electrically connecting the first conductive region and the second conductive region,
    wherein the wireless communication circuit is configured to:
    feed the first conductive region; and
    transmit or receive a signal in a specified frequency band based on an electrical path formed through the first conductive region, the plurality of connection elements, and the second conductive region.

16. The electronic device of claim 15, wherein the plurality of connection elements include:
    a first metal clip positioned at a first point on the printed circuit board;
    a second metal clip positioned at a second point on the printed circuit board; and
    a circuit element interposed between the first metal clip and the second metal clip.

17. The electronic device of claim 16, wherein the first point corresponds to one point on the printed circuit board, and corresponds to the first conductive region, and
    wherein the second point corresponds to one point on the printed circuit board, and corresponds to the second conductive region.

18. The electronic device of claim 16, wherein the wireless communication circuit transmits or receives the signal of the specified frequency band based on an electrical path formed through the first conductive region, the first metal clip, the circuit element, the second metal clip, and the second conductive region.

19. The electronic device of claim 16, further comprising:
a grip sensor circuit positioned on the printed circuit board and electrically connected with the first conductive region,
wherein the grip sensor circuit is configured to sense whether a user approaches the electronic device or whether the user touches the rear housing, based on a capacitance on an electrical path connected to the grip sensor circuit from the first conductive region and the second conductive region through the plurality of connection elements.

20. The electronic device of claim 19, wherein the grip sensor circuit senses whether the user approaches the electronic device or whether the user touches the rear housing, based on a capacitance on an electrical path formed through the first metal clip and the circuit element.

* * * * *